(12) United States Patent
Grewal et al.

(10) Patent No.: US 12,182,207 B2
(45) Date of Patent: *Dec. 31, 2024

(54) CUSTOM DATA FILTERING SYSTEMS AND METHODS

(71) Applicant: Grey Wall Software LLC, New Haven, CT (US)

(72) Inventors: Sukhminder Grewal, New Haven, CT (US); Tamas Simon, New Haven, CT (US); Rishi Raj Nema, Milford, CT (US); Ina B. Maloney, Hamden, CT (US); Drew A. Mazurek, North Haven, CT (US); Daniel Dormont, Fairfield, CT (US); Angelo Correia, Hamden, CT (US); Geoffrey A. Baum, Milford, CT (US); Kenneth E. Moon, Fairfield, CT (US); Keith L. Basile, New Haven, CT (US); Nathaniel B. Ellis, New Haven, CT (US)

(73) Assignee: Grey Wall Software LLC, New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,688

(22) Filed: May 30, 2023

(65) Prior Publication Data

US 2023/0297622 A1 Sep. 21, 2023

Related U.S. Application Data

(63) Continuation-in-part of application No. 17/579,809, filed on Jan. 20, 2022, now Pat. No. 11,663,272, (Continued)

(51) Int. Cl.
*G06F 16/00* (2019.01)
*G06F 16/9035* (2019.01)
*G06F 16/9038* (2019.01)

(52) U.S. Cl.
CPC ...... *G06F 16/9035* (2019.01); *G06F 16/9038* (2019.01)

(58) Field of Classification Search
CPC .................................................. G06F 16/9035
See application file for complete search history.

(56) References Cited

U.S. PATENT DOCUMENTS

| 8,228,821 | B2 | 7/2012 | Robinson et al. |
| 8,819,145 | B1 | 8/2014 | Gailloux et al. |

(Continued)

*Primary Examiner* — Ajith Jacob
(74) *Attorney, Agent, or Firm* — Armstrong Teasdale LLP

(57) ABSTRACT

Described herein is a custom filtering computer system for enabling custom filtering and management of tabular data does not require any computer language or similar training for the user. The custom filtering computer system configured to: receive filter criteria from a user computer device; retrieve filtered data by querying one or more databases based on the filter criteria, the filtered data including tabular data that matches the filter criteria; receive operations criteria from the user computer device; generate processed data, the processed data comprising the filtered data and operation outputs, by performing the operations defined in the operations criteria and storing the operation outputs with the filtered data; receive display criteria from a user computer device; generate a data display by applying the display criteria to the processed data; and display the data display on an output module of the user computer device.

20 Claims, 13 Drawing Sheets

Related U.S. Application Data which is a continuation of application No. 16/941,037, filed on Jul. 28, 2020, now Pat. No. 11,238,108.

(56) References Cited

U.S. PATENT DOCUMENTS

| | | |
|---|---|---|
| 9,215,194 B2 | 12/2015 | Shaffer et al. |
| 9,690,441 B2 | 6/2017 | Kim et al. |
| 10,204,105 B2 | 2/2019 | Yang et al. |
| 2004/0088359 A1 | 5/2004 | Simpson |
| 2006/0074879 A1 | 4/2006 | Covington et al. |
| 2013/0174004 A1 | 7/2013 | Ludwig |
| 2015/0012314 A1 | 1/2015 | Mohammad et al. |

CUSTOM DATA FILTERING SYSTEMS AND METHODS

CROSS-REFERENCE TO RELATED APPLICATIONS

This patent application is a continuation-in-part of and claims priority to U.S. patent application Ser. No. 17/579,809, filed Jan. 20, 2022, which is a continuation of and claims priority to U.S. patent application Ser. No. 16/941,037, filed Jul. 28, 2020, which issued as U.S. Pat. No. 11,238,108 on Feb. 1, 2022, the entire contents and disclosure of which are hereby incorporated herein by reference in their entirety.

BACKGROUND

The present disclosure relates generally to filtering and displaying data, and more specifically to computer-based systems and methods for applying custom data filters to query and display data.

Current systems for accessing specific tabular data may involve composing data queries in a computer language such as SQL. Some known systems also enable the management of tabular data through a spreadsheet format, with data organized in rows and columns. Managing tabular data in such systems may be laborious and/or require computer coding knowledge. Further, the data may be displayed in a way that is difficult for a user to comprehend and interact with.

Accordingly, a system is needed that enables customizable filtering and displays of tabular data, managed through a user-friendly interface.

BRIEF DESCRIPTION

The present embodiments may relate to systems and methods for filtering and managing tabular data. The system may include a custom filter ("CF") computer device, a database, and a user computer device for display of data.

In one aspect, a custom filtering computer system for enabling custom filtering and data management is provided. The custom filtering computer system includes at least one processor in communication with at least one memory device. The at least one processor is programmed to: (i) receive filter criteria from a user computer device, the filter criteria specifying tabular data with specific attributes; (ii) retrieve filtered data by querying one or more databases based on the filter criteria, the filtered data including tabular data that matches the filter criteria; (iii) receive operations criteria from the user computer device, the operations criteria defining operations to be performed on the filtered data; (iv) generate processed data, the processed data comprising the filtered data and operation outputs, by performing the operations defined in the operations criteria and storing the operation outputs with the filtered data; (v) receive display criteria from the user computer device, the display criteria specifying at least one display element to be applied to elements of the processed data with specific attributes; (vi) generate a data display by applying the display criteria to the processed data, wherein the data display includes the processed data and the at least one display element; and (vii) display the data display on an output module of the user computer device.

In another aspect, a computer-implemented method for enabling custom filtering and management of tabular data is provided. The method may be implemented by a computer system including at least one processor. The method includes: (i) receiving filter criteria from a user computer device, the filter criteria specifying tabular data with specific attributes; (ii) retrieving filtered data by querying one or more databases based on the filter criteria, the filtered data including tabular data that matches the filter criteria; (iii) receiving operations criteria from the user computer device, the operations criteria defining operations to be performed on the filtered data; (iv) generating processed data, the processed data comprising the filtered data and operation outputs, by performing the operations defined in the operations criteria and storing the operation outputs with the filtered data; (v) receiving display criteria from the user computer device, the display criteria specifying at least one display element to be applied to elements of the processed data with specific attributes; (vi) generating a data display by applying the display criteria to the processed data, wherein the data display includes the processed data and the at least one display element; and (vii) displaying the data display on an output module of the user computer device.

In another aspect, at least one non-transitory computer-readable storage media having computer-executable instructions embodied thereon for enabling custom filtering and management of tabular data is provided. When executed by at least one processor, the computer-executable instructions cause the processor to: (i) receive filter criteria from a user computer device, the filter criteria specifying tabular data with specific attributes; (ii) retrieve filtered data by querying one or more databases based on the filter criteria, the filtered data including tabular data that matches the filter criteria; (iii) receive operations criteria from the user computer device, the operations criteria defining operations to be performed on the filtered data; (iv) generate processed data, the processed data comprising the filtered data and operation outputs, by performing the operations defined in the operations criteria and storing the operation outputs with the filtered data; (v) receive display criteria from the user computer device, the display criteria specifying at least one display element to be applied to elements of the processed data with specific attributes; (vi) generate a data display by applying the display criteria to the processed data, wherein the data display includes the processed data and the at least one display element; and (vii) display the data display on an output module of the user computer device.

BRIEF DESCRIPTION OF THE DRAWINGS

FIGS. 1-11B show example embodiments, of the methods and systems described herein.

FIG. 1 illustrates an example block diagram of a custom filtering ("CF") computer system including a custom filtering ("CF") computer device.

FIG. 2 illustrates an example data flow using the CF computer system of FIG. 1.

FIG. 4 illustrates a cell highlighting interface displayed to a user of the CF computer system of FIG. 1.

FIG. 5 illustrates a display options interface displayed to a user of the CF computer system of FIG. 1.

FIG. 6 illustrates a grouping and operations interface displayed to a user of the CF computer system of FIG. 1.

FIG. 7 illustrates a schematic diagram of a user computer device, such as a user computing device that may be included in the CF computer system of FIG. 1.

FIG. 8 illustrates a schematic diagram of a server computing device, such as the CF computer device of FIG. 1.

FIG. 9 illustrates a diagram of a computer device and internal components, such as those that may be found in the CF computer device of FIG. 1.

FIG. 10 illustrates a flow chart of a method for custom filtering and data management using the CF computer device of FIG. 1.

FIGS. 11A and 11B illustrate a filter condition building interface generated by CF computer device and displayed on user computer device 110.

DETAILED DESCRIPTION OF THE DISCLOSURE

Figure 1:
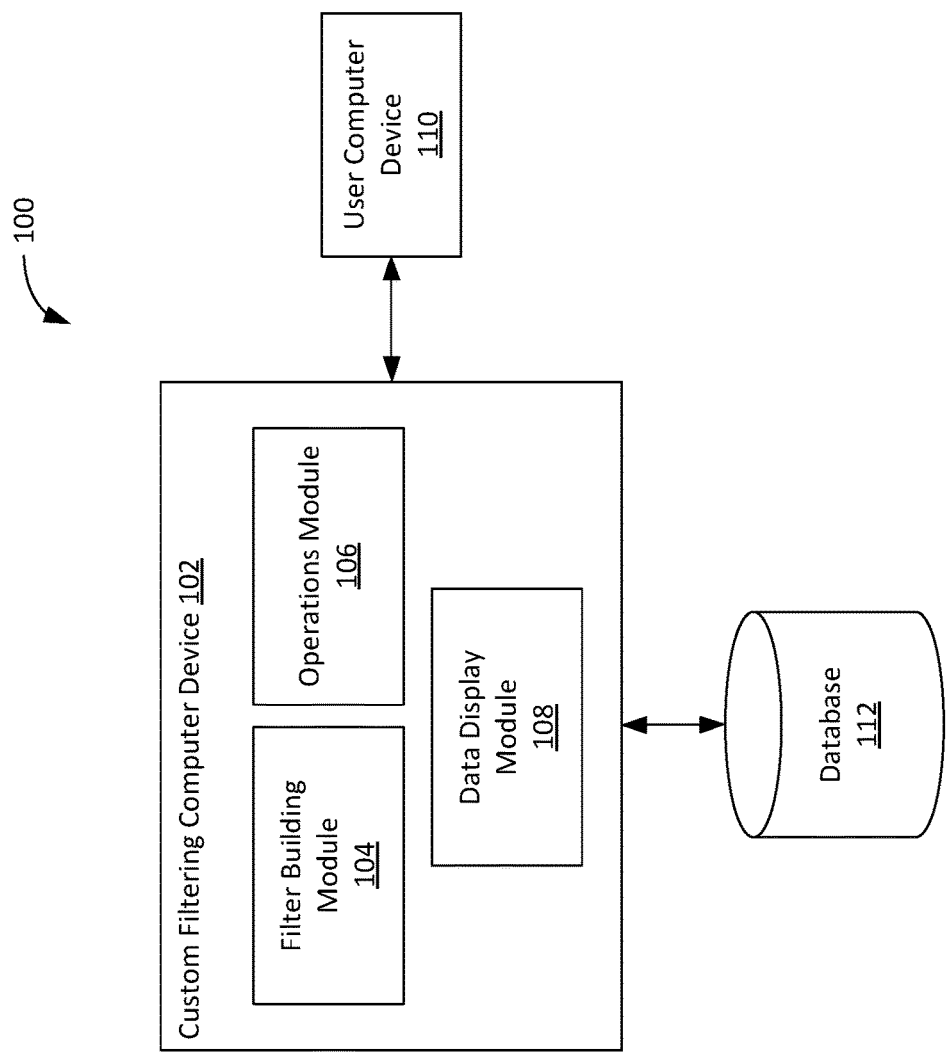

Embodiments of the present disclosure relate generally to custom filtering and management of tabular data. More particularly, the present disclosure relates to a computer system, referred to herein as a custom filtering ("CF") computer system, that allows a user to specify custom data filters, retrieves data as specified from a database, applies user-specific operations to the data, and generates data displays based on user input.

In the example embodiment, the systems and methods described herein are implemented using the CF computer system, which includes a custom filtering ("CF") computer device. The CF computer device is configured to utilize modules such as a filter building module, an operations module, and a data display module to implement the functionalities described herein. The CF computer system further includes at least a user computer device and a database, each of which is in communication with the CF computer device. In alternative embodiments, the CF computer system includes any number of the aforementioned components in any combination in communication with the CF computer device. In alternative embodiments, any of the components may perform the tasks and functionalities of the other components as described herein.

In the example embodiment, the CF computer device is configured to provide a graphical user interface ("GUI") or some other interface to a user through the user computer device. The CF computer device may provide the GUI through a web page, web application, software application, or some other means through with the user computer device can access an interface provided by the CF computer device. A user may interact with the CF computer device through the user interface such that the user is able to specify filters, operations, and display elements to apply to tabular data, as described in further detail herein.

In the example embodiment, the CF computer device is configured to filter tabular data, perform operations on the filtered tabular data, and apply display elements to the tabular data, each based on user input. The CF computer device receives filter criteria from a user, where the filter criteria include the types and aspects of the tabular data that the user would like to filter out or to receive. The CF computer device is configured to apply the filter to locally stored tabular data, or query a database for the data as specified by the user. The CF computer device is further configured to receive operations criteria from a user and automatically perform operations on the filtered data based on the operations criteria. The CF computer device is further configured to receive input from the user and automatically apply display elements to the filtered data. In some embodiments, the operations may include one or more calculations to perform on the filtered data. In other embodiments, the operations include, but are not limited to, querying another database, serially querying multiple databases, and accessing a real-time system (such as an Internet of Things sensor). For example, the CF computer device may present the user with a list of filter options via a web application based on customer relationship management ("CRM") tabular data available within a database. The CF computer device may receive filter criteria from the user indicating the user would like to see the data for transactions occurring in the last 3 months, and the CF computer device may query the database to retrieve the data specified by the filter. The CF computer device may further perform grouping operations to calculate the total number of sales made on each day for the tabular data based on received user input. Further, the CF computer device may highlight all days with sales over a certain amount and hide certain data columns that aren't included in a user selection (e.g., the user may select to see only the sale amount, the customer, and the date).

In the example embodiment the CF computer device is configured to apply filters to tabular data. The CF computer device applies filters based on filter criteria specified by a user. As used herein, "applying a filter to" or "filtering" tabular data may refer to filtering locally stored tabular data or querying a database for data matching the filter criteria. In one embodiment, applying filters, or "filtering", tabular data refers to the CF computer device querying specific data from a database based on the filter criteria. In other words, the CF computer device has access to a large amount of data within a database, and the filter criteria specify which data the CF computer device retrieves from the database. In another embodiment, filtering tabular data refers to the CF computer device filtering out, or "removing", data that doesn't conform to the filter criteria. In other words, the CF computer device may have tabular data stored locally and displayed to a user (e.g., in a spreadsheet application), and the filter criteria specify the tabular data the user would like to work with and which data the CF computer device should discard.

In the example embodiment, the CF computer device receives filter criteria from a user computer device and applies filters based on the filter criteria. The filter criteria may include, but are not limited to, filter inputs, filter operators, and specified data fields. Specified data fields may include data fields of the tabular data (e.g., data fields, elements, or columns such as "customer", "name", "author", "recipient", "date sent", "date received", "sale price", "customer location", "contract location", and "date of sale"). Filter operators specify a relationship between the filter input and the data field (e.g., "is equal to", "contains", "is greater than", "is less than", "does not contain", "is between", "is not between" and "is not equal to"). Filter inputs specify the data being filtered for within the tabular data (e.g., within specific data fields) based on the filter operators. For example, a filter criteria may include a specified data field such as "customer", a filter operator such as "is equal to", and a filter input such as "Mark Smith", such that the CF computer device retrieves all tabular data for which the "customer" matches "Mark Smith". The filter criteria may apply to one or more primary databases to obtain results that are recursively or directionally applied to subsequent databases and in turn to other subsequent databases. In some embodiments, all criteria are set up in the one saved view for later access. In some embodiments, applying filter criteria to one database produces a table of results. One or more fields from the table of results are then applied to a second database for further results that are also filtered with their own criteria and so on.

In some embodiments, the table of results may be associated with a hyperlink. The activating the hyperlink on the user computer device would allow the user access to the table of results. In some of these embodiments, activation of the hyperlink includes access rights to the table of results. The hyperlink may be shared with other users, who would have access to the table of results upon activating the hyperlink.

In the example embodiment, the CF computer device is configured to receive and apply multiple filter criteria when filtering tabular data. In other words, a user may specific multiple filter criteria as described above, and the CF computer device may pull data that meets the filter criteria. In one embodiment, the CF computer device connects multiple filters using Boolean conjunctions such as "and", "or", "not" and "and not", based on an input specified by the user. For example, a user may input filter criteria defining two filters including "date" "is between" "Jan. 1, 2018 and Jun. 30, 2018" and "date" "is between" "Jan. 1, 2019 and Jun. 30, 2019", and these filter criteria may be joined by the "or" conjunction, such that the CF computer device retrieves tabular data with dates within either specified range.

In the example embodiment, the CF computer device is further configured to apply multiple filter groups when filtering tabular data. A filter group includes at least one filter, and multiple filter groups may be joined with Boolean conjunctions. Filter groups add an additional layer of user-accessibility to the filtering, such that a user may easily create nested filtering groups for filtering the data. In other words, groups of filters connected by Boolean conjunctions may themselves be connected by Boolean conjunctions. For example, the CF computer device may receive two filter groups, the first including the two filters described above, such that the first filter group searches for any data with a "date" between Jan. 1, 2018 and Jun. 30, 2018 or Jan. 1, 2019 and Jun. 30, 2019. The second filter group may include a first filter for any "customer names" matching "ABC Inc." and a second filter for any "customer names" matching "XYZ Corp.", connected with an "or" operator. The CF computer device may apply both filter groups, connected with an "and" operator, such that the CF computer device retrieves tabular data associated with the specified customers within the specified dates.

In the example embodiment, the CF computer device is further configured to receive operations criteria from the user computer device and automatically perform specified groupings and/or operations on the filtered data based on the operations criteria. Operations criteria may specify any of a number of operations to be automatically performed on the filtered data. In one embodiment, the operations criteria include a specified data field (e.g., the columns or labels of the tabular data) and a specified operation to be performed on the specified data field (e.g., sum or total or percentage). For example, the operations criteria may specify finding the total of all the values in the "sales" column. In some embodiments, the operations criteria further includes a grouping element for further defining the operations by specifying groupings within the data field over which the specified operations may be performed. For example, a grouping element of the operations criteria may include "industry", while the data field is "sales" and the specified operation is "total", such that CF computer device calculates the total sales for each industry.

In the example embodiment, the CF computer device is further configured to receive display options criteria from the user computer device and generate a data display of the processed tabular data based on the display options criteria. Specifically, the CF computer device is configured to generate elements to apply to the processed tabular data, such as, but not limited to, highlighting, coloring text, increasing text size, changing font, and applying bold, italics, or underlining. Additionally, the CF computer device is configured to hide or unhide certain elements of the processed tabular data, such as hiding specific columns or rows.

In the example embodiment, the CF computer device is configured to alter the display of the processed tabular data based on display options criteria received from a user computer device. In one embodiment, the display options criteria specify elements of the tabular data, such as "columns", "rows", and "cells", along with criteria for what the elements contain. Specifically, as described above, filter operators and Boolean conjunctions are used to specify how the criteria are applied to each element of the data. For example, the display options criteria may apply to "columns", "rows", and/or "cells" that "contain", "are equal to", "are between", "are greater than", "are less than", and/or "do not contain", among others, and an input value specified in the display options criteria. For example, the display options criteria may specify that all cells in column B with a value greater than 4 should be highlighted. In another example, the display options criteria may specify that all rows with cells in the "industry" column that contain "engineering contractor" should be hidden from view.

In the example embodiment, the CF computer device is configured to store at least one of the filter criteria, operations criteria, and display options criteria in a saved display, such that the criteria can be specified again by loading the saved display. In other words, the CF computer device is configured to store a saved display at any time within a custom data filtering and management process, such that the currently specified filter criteria, operations criteria, and display criteria are saved. The CF computer device is further configured to utilize saved displays to retrieve data, perform specified operations, and alter the display of the tabular data without further user input.

In the example embodiment, the CF computer device is configured to store one or more conditions. When a condition is matched, then the CF computer device can perform one or more additional actions. When one or more of the conditions are met then one or more pre-determined actions are triggered. In some situations, an action may trigger upon a single condition being met. In other situations, an action may trigger only when multiple conditions are met. Furthermore, multiple actions may be triggered on the same conditions. For example, if a condition for number of accounts opened has been reached, the CF computer device may generate and transmit one or more notifications, such as, but not limited to, emails. The notifications may be sent to specific individuals or to all of the accounts depending on how the user set-up the conditions and response. In another situation, the CF computer device may generate a work order, a purchase order, and/or other types of documents when at least one of the one or more conditions are reached.

In the example embodiment, the CF computer device creates dynamic a list of people from the filter results. The CF computer device generates a list (table) of people or objects with attributes that may include, but are not limited to, function, location, weight, length, PH, etc. For example, the CF computer device can build a filter to show all Finance people in Illinois, and use that rule to populate the "Illinois, Finance List," This list is dynamically rebuilt. The dynamic list is then referenced in static plans, but the dynamic nature ensures that the people in the list are always current. The records in the database or table may change but the filter-list connection keeps the list up to date. For the list of finance people, and the CF computer device adds an additional record with the attribute Illinois, the CF computer device adds that record to the list automatically for use anywhere else. The list may be used in another table, for sending a regular email (aka a mailing list), or for sending Christmas presents. The list may be used by a program or system separate from the CF computer device and updated through a connection to the other program or system that is using the dynamic list.

The technical problems addressed by this system include at least one of: (i) lack of user-friendly interface for creating and applying custom data filters for retrieving data; (ii) inability to query data from a database without knowledge of a computer-coding language; (iii) wasted local storage used for storing tabular data not needed by a user; and (iv) lack of systems for adequately altering the display of data in a customized, user-friendly manner.

The methods and systems described herein may be implemented using computer programming or engineering techniques including computer software, firmware, hardware or any combination or subset thereof, wherein the technical effects may be achieved by performing the computer operations described herein, which may include, but are not limited to, the following steps: (i) receive filter criteria from a user computer device; (ii) retrieve filtered data by querying a database based on the filter criteria, the filtered data including tabular data that matches the filter criteria; (iii) receive operations criteria from the user computer device; (iv) generate processed data from the filtered data by performing the operations indicated in the operations criteria and storing outputs from the operations with the filtered data; (v) receive display criteria from a user computer device; (vi) generate a data display by applying the display criteria to the processed data, wherein the data display includes the processed data and the at least one display element; and (vii) display the data display on an output module of the user computer device.

The technical benefits achieved by the methods and systems described herein include: (i) providing a user-friendly interface that requires no technical training or computer programming expertise for creating and applying custom data filters for retrieving data; (ii) enabling data queries without knowledge of or learning any computer-coding language; (iii) freeing space on local storage by reducing storage capacity utilized for storing unneeded data; (iv) enabling display alterations based on user input; and (v) sharing over the internet data analysis results and insights.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any structured collection of records or data that is stored or may be stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The system is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 illustrates a block diagram of a custom filtering ("CF") computer system 100 for implementing custom filters and managing tabular data. CF computer system 100 includes a custom filtering ("CF") computer device 102, which is configured to utilize modules such as a filter building module 104, a operations module 106, and a data display module 108 to enable some or all of the functionalities described herein. In alternative embodiments, CF computer device 102 utilizes any number of the referenced modules in any combination, and may further utilize additional modules or no modules at all.

In the example embodiment, CF computer device 102 is in communication with a user computer device 110 and a database 112. In alternative embodiments, MA computer system 100 may include any of the aforementioned components in any combination in communication with CF computer device 102.

In the example embodiment, CF computer device 102 is configured to apply data filters, automatically perform operations, and generate data displays, all based on user-specified criteria. Filter building module 104 is configured to receive filter criteria and query database 112 to retrieve filtered data. Operations module 106 is configured to receive operations criteria from user computer device 110 and apply operations criteria to the filtered data to generate processed tabular data. Data display module 108 is configured to receive display options criteria and alter the display of the processed tabular data. Module operations are described in more detail with reference to FIG. 2 below.

In the example embodiment, CF computer device 102 is configured to communicate with user computer device 110. User computer device 110 may be any computer device capable of communicating with CF computer device 102 and enabling a user or administrator to access CF computer device 102, such as, but not limited to, a desktop computer, laptop, smartphone, or tablet. For example, a user may log in to an application through user computer device 110 that connects user computer device 110 to CF computer device 102. CF computer device 102 may then display tabular data, processed data, filter options, display options, and other elements of the custom data filtering process through user computer device 110 such that the user may alter inputs and view outputs of the custom data filtering process. In the exemplary embodiment, CF computer device 102 receives user input such as filter criteria, operations criteria, and display options criteria from user computer device 110. In one embodiment, CF computer device 102 receives administrative inputs from user computer device 110, such as settings, preferences, and software updates, among other things.

In the example embodiment, CF computer device 102 is configured to communicate with database 112. Database 112 may store any of the data described herein, including, but not limited to, tabular data, filtered data, processed data, display data, filter criteria, operations criteria, display options criteria, and saved views. CF computer device 102 is configured to receive data from database 112 as necessary to enable the functionalities of the MA computer system 100 as described herein. In one embodiment, CF computer device 102 has access to all the data within database 112 and uses filter criteria to determine which data to retrieve from database 112. In another embodiment, CF computer device 102 and/or a particular user has access to only a portion of data within database 112. CF computer device 102 is further configured to store any of the data described herein in database 112. In alternative embodiments, database 112 may be local to CF computer device 102 or may be remotely accessed through a database server.

In some embodiments, CF computer device 102 is in communication with the user computer device 110 over the Internet. Furthermore, in some embodiments, the CF computer device 102 provides access to the filter building module 104, operations module 106, and the data display module 108 as a part of a cloud service. In addition, CF computer device 102 may be in communication with and providing access to cloud services to a plurality of user computer devices 110.

Figure 2:
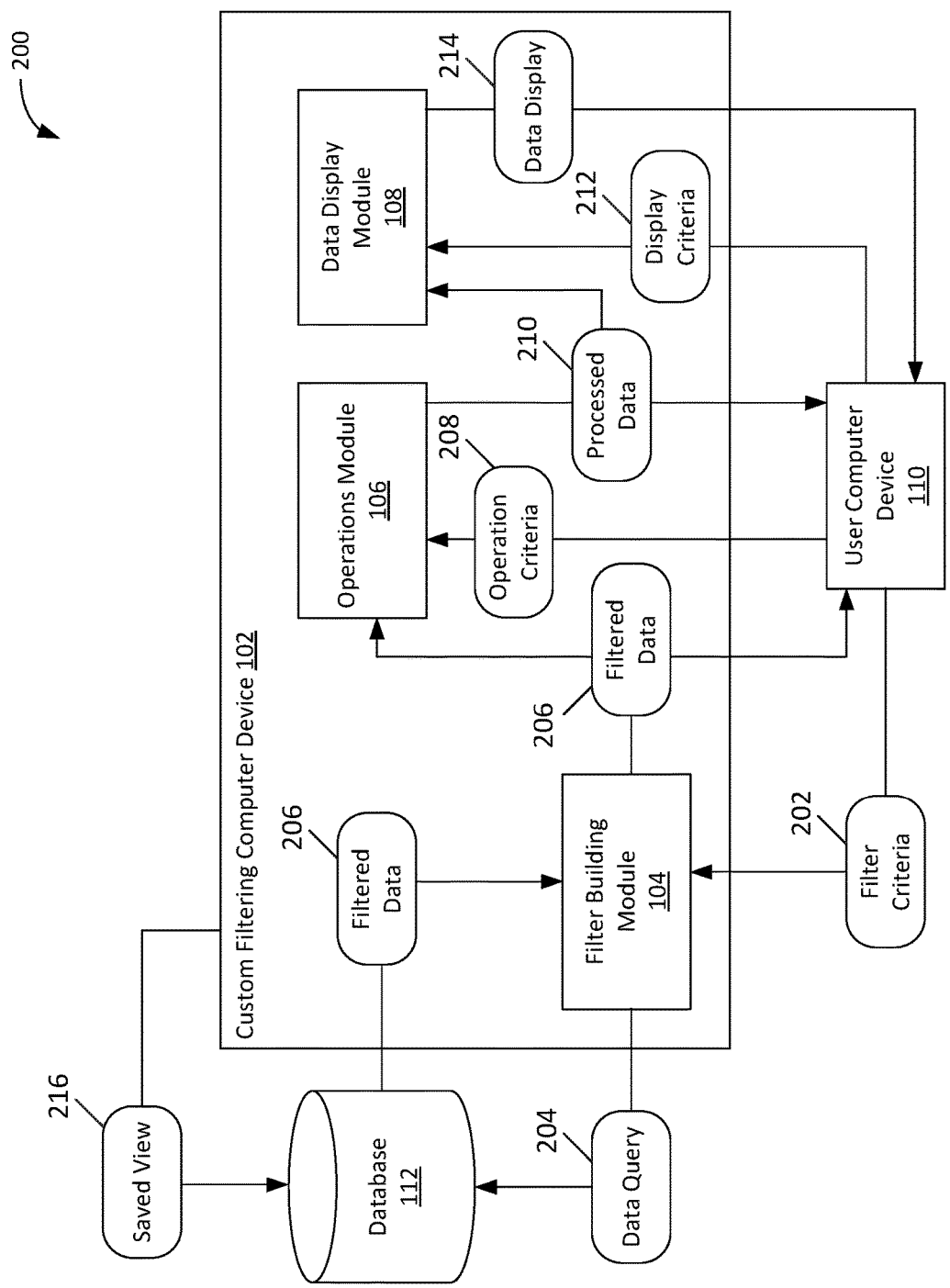

FIG. 2 illustrates an example data flow 200 using CF computer system 100 (shown in FIG. 1). In the example embodiment, CF computer device 102 receives at least one of filter criteria 202, operations criteria 208, and display criteria 212 from user computer device 110 and outputs at least one of filtered data 206, processed data 210, and data display 214 to user computer device 110.

In the example embodiment, filter building module 104 is configured to receive filter criteria 202 from user computer device 110, where filter criteria 202 includes a specified data field indicating the data field to which the filter is applied (e.g., data fields, elements, or columns of the tabular data such as "name", "customer name", "location", "industry", "date", "time", "subject matter", and "associated project", among others), a filter input indicating the content being filtered for (e.g., a text string, a file-type specification such as image, video, or text, and/or a selection from a list of options), and a filter operator for specifying how to apply the filter input (e.g., operators such as "contains", "does not contain", "is equal to", "is greater than", "is less than", "is between", "is outside the range", and "has matching data type", among others). For example filter criteria 202 may specify filtering for data that includes the text "St. Louis" in the location column. The filter criteria may apply to one or more primary databases to obtain results that are recursively or directionally applied to subsequent databases and in turn to other subsequent databases. In some embodiments, all criteria are set up in the one saved view for later access. In some embodiments, applying filter criteria to one database produces a table of results. One or more fields from the table of results are then applied to a second database for further results that are also filtered with their own criteria and so on.

In some embodiments, the table of results may be associated with a hyperlink. The activating the hyperlink on user computer device 110 would allow the user access to the table of results. In some of these embodiments, activation of the hyperlink includes access rights to the table of results. The hyperlink may be shared with other users, who would have access to the table of results upon activating the hyperlink.

In the example embodiment, CF computer device 102 is configured to present an interface to a user, via user computer device 110, for inputting filter criteria 202. In one embodiment, CF computer device 102 enables a user to select a data field within which to apply the filter (e.g., columns within the tabular data), input a text filter input (e.g., text), and choose from a pre-determined list of filter operators (e.g., "contains"). In alternative embodiments, the CF computer device 102 is configured to receive user input in any format and generate filter criteria 202. For example, a user may simply type text into a filter-input box, and CF computer device 102 may automatically apply a "contains text" filter to all the tabular data. In another embodiment, CF computer device 102 presents options through an interface so that a user can select any of the elements of filter criteria 202 (e.g., filter input, data fields, and filter operators).

In the example embodiment, filter criteria 202 may include Boolean conjunctions for joining multiple elements of filter criteria 202. Specifically, filter criteria 202 may include Boolean conjunctions such as AND, OR, and NOT joining multiple filter inputs, data fields, and/or filter operators. For example, filter criteria 202 may include the filter input "St. Louis", the filter operator "contains", and the data fields "customer location OR seller location", such that filter criteria 202 specifies tabular data in which either the customer location column or seller location column include the text "St. Louis".

In another embodiment, filter criteria 202 include multiple filters joined by Boolean conjunctions. Specifically, filter criteria 202 may include multiple filters, each filter including a filter input, data field, and filter operator, and each filter may be joined by a Boolean conjunction. For example, filter criteria 202 may include a first filter indicating a filter input of "St. Louis", a filter operator "contains text", and a data field "customer location" and a second filter indicating a filter input of "Chicago", a filter operator "contains text" and a data field "seller location". The first and second filters may be joined by an AND conjunction, such that filter criteria 202 specifies data for which the customer location column includes the text "St. Louis" and the seller location column contains the text "Chicago".

In one embodiment, filter criteria 202 may include multiple filter groups, each filter group including at least one filter. Specifically, each filter may specify a data field, a filter input, and a filter operator, and each filter within a group may joined with a Boolean conjunction. Each filter group may also be joined with a Boolean conjunction, such that filter criteria 202 effectively contains nested filters. For example, a first filter group may include the two filters described in the example above, specifying data for which the customer location column includes the text "St. Louis" and the seller location column contains the text "Chicago". A second filter group may include a first filter specifying the industry column matches the text "engineering contractor" and a second filter specifying the industry column matches the text "engineering consulting", with the first and second filters in the second filter group joined with the OR conjunction. The two filter groups may be joined by an AND conjunction, such that filter criteria 202 specifies all data where the industry column includes "engineering contractor OR engineering consulting", the seller location column includes "Chicago", and the customer location column includes "St. Louis". In some embodiments, filter criteria 202 may be saved, such as in the database 112 or other memory. The user may apply a name and/or a label to the saved filter criteria 202. Furthermore, the saved filter criteria 202 may include security, such as restricting access to one of the saved filter criteria 202 or its results if the provided results are considered private information.

In the example embodiment, a first set of filter criteria 202 may provide access to public data, while a second set of filter criteria 202 may provide access to private information. The second set of filter criteria 202 may be kept private and may require a password or other access control to access and/or run.

Furthermore, in the example embodiment, some of the information in database 112 may be subject to access control. For example, database 112 may contain Personal Identifiable Information (PII) and/or Health Insurance Portability and Accountability Act (HIPAA) information. This information would only be accessible by those with the proper access credentials. For example, a user may transmit a set of filter criteria 202. The CF computer device 102 would determine the access level or credentials associated with that user. The CF computer device 102 would then modify the filter criteria 202 to ensure that the user only receives data appropriate to their access level or credentials. An individual record may include both public and private information. The CF computer device 102 would ensure that the filtered data 206 only includes information that the user is allowed to see. In some embodiments, the CF computer device 102 modifies the filter criteria 202 and/or the data query 204. In other embodiments, the CF computer device 102 modifies the filtered data 206. For example, the fields in the database may include a tag or identifier to indicate that those fields contain private or public information. The fields may also include an access level or access credential required to access those fields.

In the example embodiment, filter building module 104 receives filter criteria 202 and retrieves data based on filter criteria 202. Specifically, filter building module 104 generates a data query 204 based on filter criteria 202, and transmits data query 204 to database 112. Filter building module 104 receives filtered data 206 from database 112 based on data query 204. For example, filter criteria 202 may specify filtering for all data for which the "sale date" is any date in the year 2019. Filter building module 104 generates data query 204 based on filter criteria 202 and transmits data query 204 to database 112. Filter building module 104 may then receive filtered data 206 from database 112 based on the query, where filtered data 206 includes all data for which the "sale date" has a year of 2019.

In one embodiment, filter building module 104 generates data query 204 by converting filter criteria 202 into a querying language compatible with database 112. In alternative embodiments, CF computer device 102 receives filter criteria 202 in a variety of formats, including, but not limited to, text, selection from set choices, audio, video, and images, among others. In one embodiment, CF computer device 102 receives natural language text or audio (e.g., text or audio typed or spoken in phrases or sentences). CF computer device 102 is configured to use trained models for converting audio to text, natural language processing ("NLP") models for determining meaning of the text, and other trained machine learning models for converting the text to a filter (or multiple filters or filter groups) based on the text. For example, a user may input audio through user computer device 110 of the user saying "I'd like to see all customer accounts based in Chicago". CF computer device 102 may receive the audio input, translate the audio to text using a program or module, and assign meaning to the text using an NLP model. Based on the meaning of the text, CF computer device 102 may determine a filter and generate data query 204 to pull the data specified in the user's audio input.

In one embodiment, CF computer device 102 includes a memory that stores tabular data to which filter criteria 202 are applied. Specifically, CF computer device 102 stores tabular data in a local memory and filter building module 104 generates filtered data 206 by applying filter criteria 202 to the stored tabular data. In one embodiment, CF computer device 102 displays the tabular data in a spreadsheet computer application format and filter criteria 202 are used to discard, hide, and/or ignore the data that doesn't meet filter criteria 202. In the example embodiment, filter building module 104 displays filtered data 206 via user computer device 110.

In the example embodiment, operations module 106 is configured to receive filtered data 206 from filter building module 104. Operations module 106 is configured to apply grouping and/or operations to filtered data 206 based on operations criteria 208 received from user computer device 110. Operations criteria 208 specify any of a number of operations to be automatically performed on filtered data 206. In one embodiment, operations criteria 208 includes a specified data field (e.g., the columns or labels of the tabular data), a specified operation to be performed on the specified data field (e.g., sum or total or percentage). In some embodiments, the operations may include one or more calculations to perform on the filtered data. In other embodiments, the operations include, but are not limited to, querying another database, serially querying multiple databases, and accessing a real-time system (such as an Internet of Things sensor). For example, operations criteria 208 may specify finding the total of all the values in the "sales" column. In some embodiments, operations criteria 208 further includes a grouping element for further defining the operations by specifying groupings within the data field over which the specified calculations and/or operations may be performed. For example, a grouping element of operations criteria 208 may include "industry", while the data field is "sales" and the specified operation is "total", such that operations module 106 calculates the total sales for each industry.

In alternative embodiments, CF computer device 102 receives operations criteria 208 from user computer device 110 before or after retrieving filtered data 206. In one embodiment, CF computer device 102 is configured to display an interface to a user for receiving operations criteria 208 via text input, selection input, or other types of inputs. CF computer device 102 may further receive operations criteria 208 as text or audio input and utilize models for interpreting the input as described above with reference to receiving filter criteria 202.

In the example embodiment, operations module 106 is configured to generate processed data 210 based on filtered data 206 and the operations performed based on operations criteria 208. In one embodiment, operations module 106 generates processed data 210 by storing the operations within filtered data 206 as tabular data conforming to the format of filtered data 206. In an alternative embodiment, operations module 106 generates processed data 210 by storing the operation within a separate sheet or tab or file associated with filtered data 206. In the example embodiment, operations module 106 is configured to output processed data 210 to user computer device 110. In some embodiments, the operations module 106 generates the processed data 210 based on querying other additional databases or querying devices (i.e., Internet of Things devices) that may have real-time data. In these embodiments, the operations criteria may be applied to these additional operations.

In the example embodiment, data display module 108 is configured to receive processed data 210 and display criteria 212 and generate data display 214. Display criteria 212 include any input such as user preferences, user settings, user selections, text data, and audio data, among others, specifying display elements to be applied to processed data 210. In one embodiment, display criteria 212 include a specified criteria (e.g., criteria including an input, operator, and data field, as described above with reference to filter criteria 202) along with a specified display element (e.g., a visual or display alteration to be applied to data matching the criteria). In alternative embodiments, display elements include, but are not limited to, highlighting, coloring text, coloring cell backgrounds, altering font or font size, altering the bolding, underlining, italicizing, or striking through of text, and hiding and unhiding columns or other data, among others. For example, display criteria 212 may include criteria specifying all data entries that include "New York" within a location column and a display element indicating that the specified data entries should be highlighted orange. As another example, display criteria 212 may include a criteria specifying all text in a data set matching a keyword such as "analytics" should be bolded throughout the data set. As another example, display criteria 212 may specify columns or data labels that should be hidden, such as specifying that the columns displaying "industry" and "location" should be hidden from view.

In the exemplary embodiment, data display module 108 is configured to apply display criteria 212 to processed data 210 and generate data display 214. Data display module 108 is further configured to transmit data display 214 to user computer device 110 and/or display data display 214 via a user-interface accessed by user computer device 110.

In one embodiment, CF computer device 102 may receive criteria including filter criteria, operations criteria, and display criteria via a map selection input. Specifically, CF computer device 102 may receive the filter inputs of the criteria using a map selection input, which includes selecting a geographic area of a map such that the filter inputs include the locations within the geographic area. In one embodiment, to specify filter inputs that fall within a certain geographical location, CF computer device 102 displays a map interface and allows a user to input a geometrical shape (e.g., a circle or a quadrilateral) with specific dimensions or to freehand draw an area on the map. CF computer device 102 may determine all locations included within the specified area through various means, such as latitude and longitude parameters, zip codes, cities, and counties, among others. CF computer device 102 is configured to utilize the input location information as filter inputs in any of the aforementioned criteria, such that the criteria (e.g. filers, operations, or displays) are applied to the locations drawn on the map.

In alternative embodiments, filter building module 104, operations module 106, and data display module 108 may process data in any order. For example, operations module 106 may apply operations criteria to a large set of tabular data prior to filter building module 104 applying filters to the data. In other embodiments, only some of the modules may be utilized. For example, filter building module 104 may generate filtered data 206 and data display module 108 may generate data display 214 based on filtered data 206. In alternative embodiments, any of filter building module 104, operations module 106, and data display module 108 may utilize any of filtered data 206, processed data 210, and data display 214 as inputs.

In the example embodiment, CF computer device 102 is configured to store any of filter criteria 202, filtered data 206, operations criteria 208, processed data 210, display criteria 212, and data display 214 as a saved view 216. Specifically, CF computer device 102 generates saved view 216 to include any of the aforementioned data such that CF computer device 102 (or user computer device 110, via an interface provided by CF computer device 102) may load saved view 216 and access custom filtered data as previously generated and saved. For example, after CF computer device 102 applies a number of filters and retrieves filtered data 206, CF computer device 102 is configured to generate saved view 216 including filtered data 206, such that a user can access filtered data 206 by loading saved display 216 rather than having to re-apply filter criteria 202. As another example, after generating data display 214, CF computer device 102 may store data display 214 as a saved view 216 so that a user can access data display 214 by loading saved display 216 rather than re-applying filter criteria, operations criteria, and display criteria. In some embodiments, the saved view 216 is catalogued by one or more of user, group, list or category.

Figure 3A:
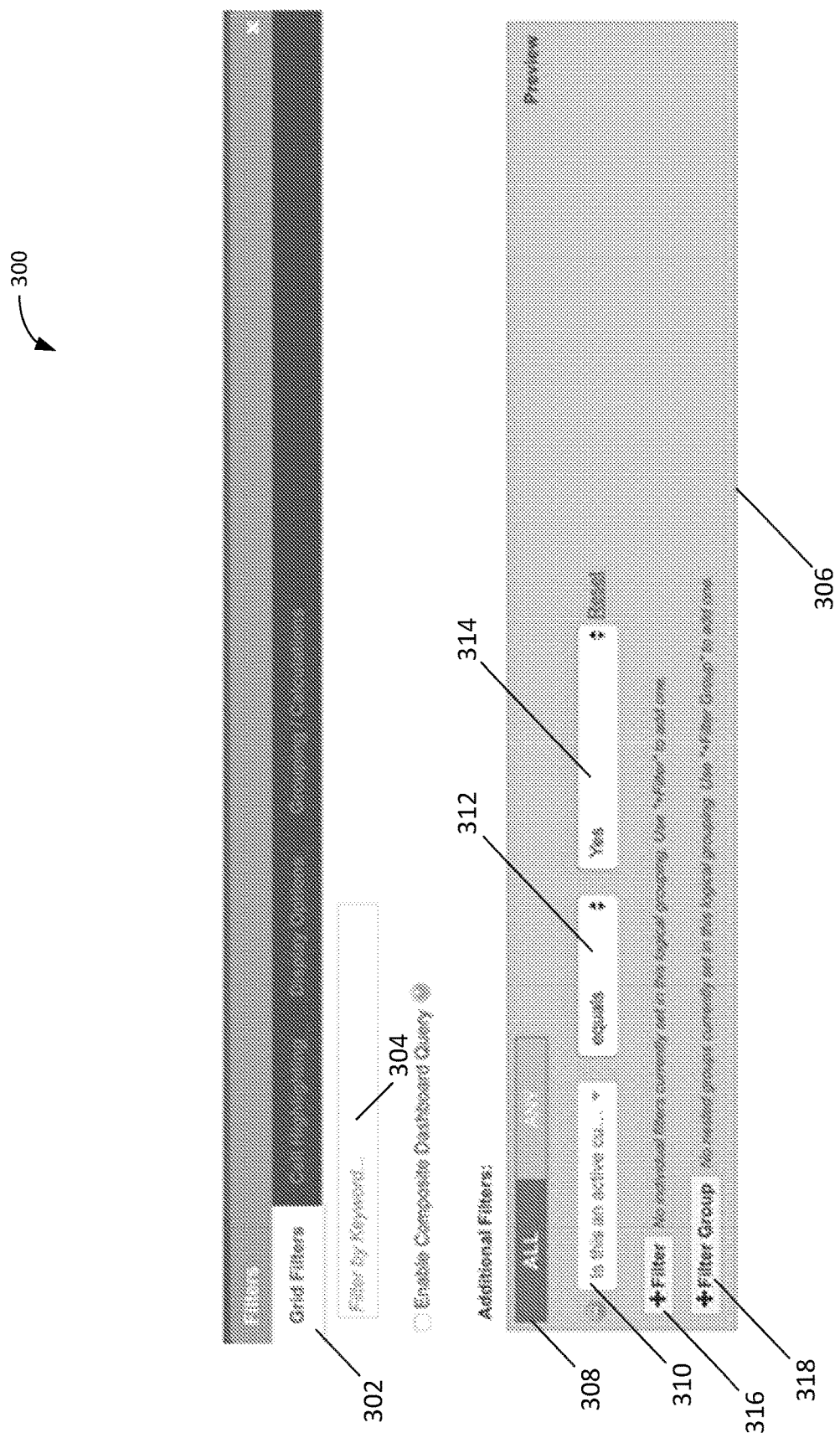
FIG. 3A illustrates a first embodiment of a filter building interface displayed to a user of the CF computer system of FIG. 1.

FIG. 3A illustrates a first embodiment of a filter building interface 300 generated by CF computer device 102 and displayed on user computer device 110 (both shown in FIG.

1). Filter building interface 300 allows a user to enter inputs for building filters (e.g. filter criteria 202, shown in FIG. 2) used by CF computer device 102 to retrieve specified data.

Filter building interface 300 includes a functions tab 302 which enables a user to switch between functions of CF computer device 102. In the example embodiment, functions tab 302 includes a "Grid Filters" function for building filters (described in more detail with regard to FIGS. 3A and 3B), a "Cell Highlighting" function for specifying display elements related to cell highlighting (described in more detail with regard to FIG. 4), a "Display Options" function for specifying display elements related to hiding and unhiding data (described in more detail with regard to FIG. 5), and a "Grouping/Operations" function for specifying operations to be performed on tabular data (described in more detail with regard to FIG. 6).

In the example embodiment, filter building interface 300 further includes filter input bar 304, which enables a user to input text to be used as a filter input. For example, a user may input a text keyword such as "pet store" that the user would like to search for within available data, and the user can input the text "pet store" into filter input bar 304 to define the text for the filter.

In the example embodiment, filter building interface 300 further includes filter builder 306 for building filters and displaying current filters. Filter builder 306 include conjunction selection 308, filter input option 310, filter operator selection 312, and filter toggle 314. Conjunction selection 308 enables a user to apply Boolean conjunctions such as AND, OR, and NOT to filters within a group. In one embodiment, conjunction selection 308 allows a user to choose from "ALL" and "ANY", which correspond to the Boolean conjunctions AND and OR respectively. Conjunction selection 308 is configured to apply Boolean conjunctions to the highest-level filter groups organized under the given conjunction selection 308 (described in more detail with regard to FIG. 3B).

In the example embodiment, filter input options 310 enables a user to select from different filter inputs to use as part of the filter, such as filtering for active cells, active projects, and blank cells, among other options. Filter operator selection 312 allows a user to select a filter operator to apply to the filter, specifically to the filter input options 310 and/or any filter input specified in filter input bar 304. Filter operator selection 312 may allow a user to select filter operators such as "equals", "does not equal", "contains", "does not contain", "is between", "is not between", "matches", and "similar", among others. Filter toggle 314 enables a user to toggle the filter on and off, for example, by selecting options such as "on", "off", "yes", and "no".

In the example embodiment, filter building interface 300 further includes add filter option 316 for adding another filter within the current filter group and add filter group 318 for adding another filter group. Add filter option 316 enables a user to add additional filters within the current filter group, and may enable a user to select from different filter types (e.g., a filter using filter input options 310, filter operator selection 312, and filter toggle 314 or a filter using keywords specified in filter input bar 304). Add filter group 318 adds another filter group within with additional filters can be added.

Figure 3B:
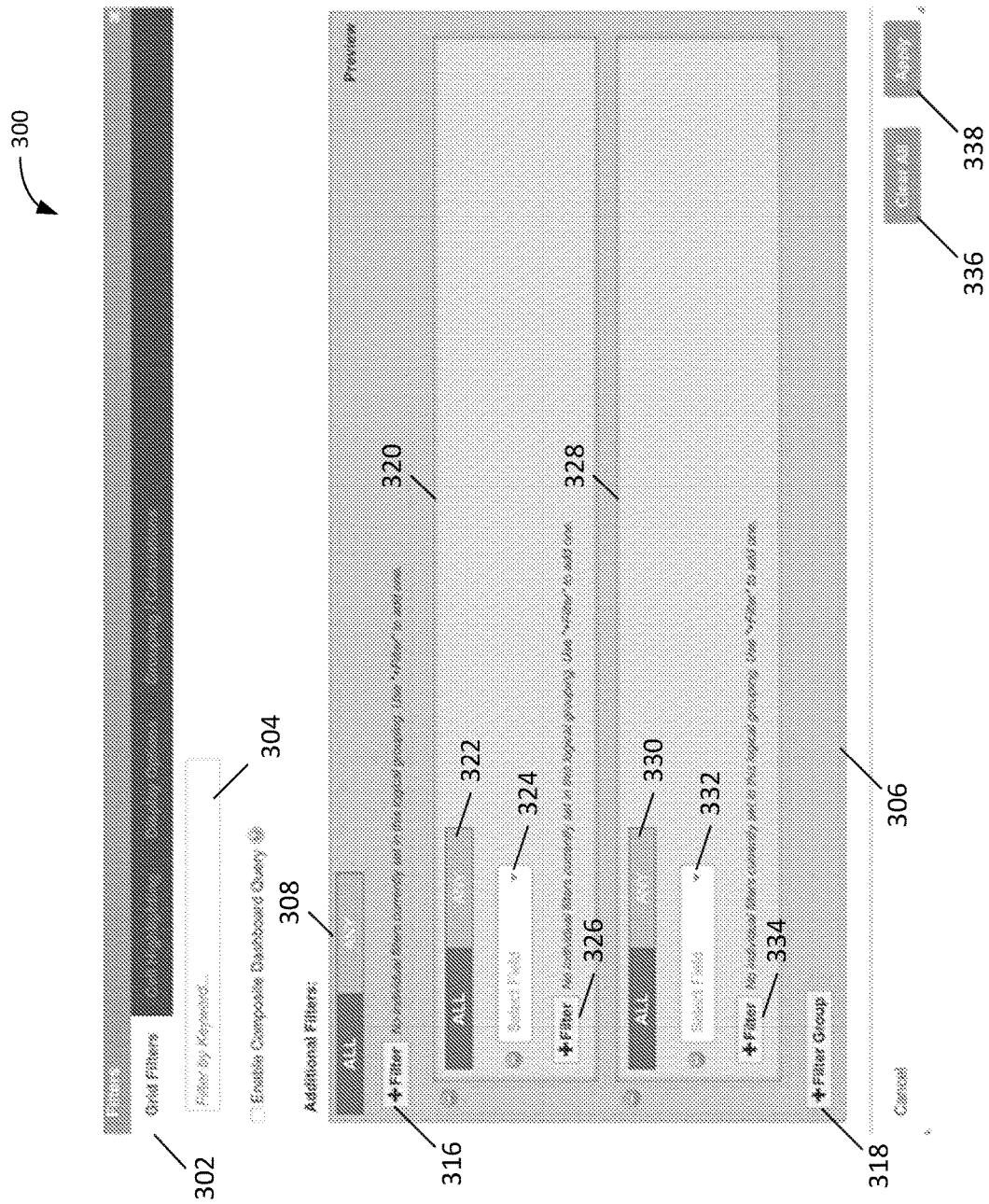
FIG. 3B illustrates a second embodiment of a filter building interface displayed to a user of the CF computer system of FIG. 1.

FIG. 3B illustrates a second embodiment of filter building interface 300 generated by CF computer device 102 and displayed on user computer device 110 (both shown in FIG. 1). Filter building interface 300 further includes functions tab 302, which is described in more detail with regard to FIG. 3A. Filter building interface 300 further includes filter input bar 304, filter builder 306, conjunction selector 308, add filter option 316, and add filter group option 318, which are described in more detail with regard to FIG. 3A.

In the example embodiment, filter building interface 300 further includes a first filter group 320, including conjunction selector 322, keyword filter 324, and add filter option 326. First filter group 320 includes conjunction selector 322, which is similar to conjunction selector 308 and enables a user to select a Boolean conjunction to apply to the filters within filter group 320. First filter group 320 further includes keyword filter 324, which, in the current embodiment is a keyword filter that enables a user to select a field within which to search for a keyword specified in filter input bar 304. Add filter option 326 enables a user to add additional filters within the current filter group, and may enable the user to select a type of filter to add (e.g., a keyword filter, or a cell options filter).

In the example embodiment, filter building interface 300 includes a second filter group 328, including conjunction selector 330, keyword filter 332, and add filter option 334. Second filter group 328, conjunction selector 330, keyword filter 332, and add filter option 334 are analogous to first filter group 320, conjunction selector 322, keyword filter 324, and add filter option 326 respectively.

In the example embodiment, conjunction selector 308 applies a Boolean conjunction linking the different filter groups 320 and 328. Add filter option 316 adds an individual filter within the same logical grouping as filter groups 320 and 328. Add filter group option 318 adds another filter group within the same logical grouping as filter groups 320 and 328. Add filter option 326 adds another filter within the same logical group as keyword filter 324, while add filter option 334 adds another filter within the same logical group as keyword filter 332.

In the example embodiment, filter building interface 300 further includes clear all option 336 for clearing all filters and filter groups and apply option 338 for applying the set filters, enabling CF computer device 102 to query and/or generate filtered data based on the filters.

Figure 4:
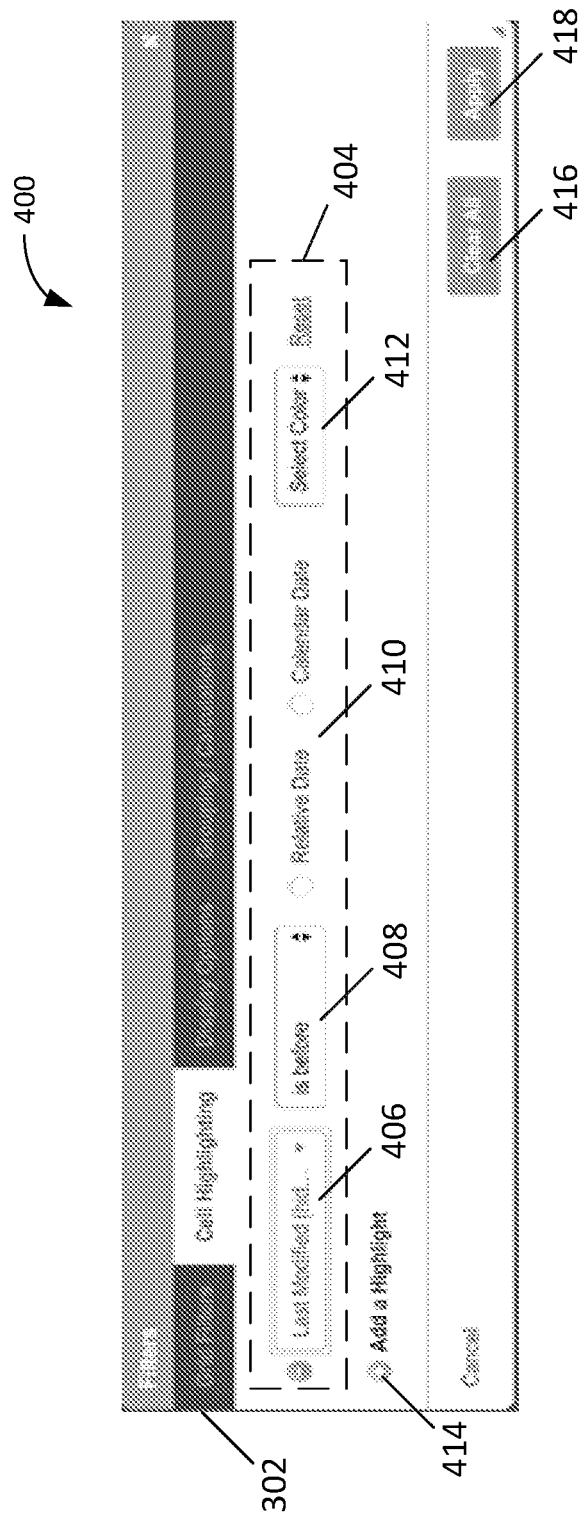

FIG. 4 illustrates a cell highlighting interface 400 generated by CF computer device 102 and displayed on user computer device 110 (both shown in FIG. 1). In the example embodiment, cell highlighting interface 400 enables a user to input criteria for highlighting specific data. Cell highlighting interface 400 includes functionality options 302, which are described in more detail with reference to FIG. 3A above.

In the example embodiment, cell highlighting interface 400 includes highlight criteria 404, which enable a user to define criteria for highlighting cells of tabular data processed by CF computer device 102. Highlight criteria 404 include data field selection 406, criteria operator 408, criteria input 410, and highlighting color 412. Data field selection 406 allows a user to select the data field to which the filter will be applied. In one embodiment, data field selection 406 provides a list of data fields to the user, where the data fields correspond to the column headers of tabular data. For example, data field selection 406 may enable a user to select from "date modified", "industry", "customer name", "date added" or any other data field associated with the tabular data being processed.

In the example embodiment, criteria operator 408 enables a use to select a function for assessing the data field selected in data field selection 406 against input received via criteria input 410. Specifically, criteria operator 408 determines the relationship between data field selection 406 and criteria input 410. For example, criteria operator 408 may include options such as "is before", "is after", "is between", "matches", "equals", "is greater than", and "is less than", among others. Criteria input 410 allows a user to input a numeric or text value that data is checked against based on the criteria operator 408. For example, criteria input 410 may be "Jan. 1, 2020", criteria operator 408 may be "is before", and data field selection 406 may be "date modified", such that the criteria specifies any cells (or entries) that have a date modified date before Jan. 1, 2020. Highlighting criteria 404 also include highlighting color 412 for selecting a color to apply to data that meet the criteria set by data field selection 406, criteria operator 408, and criteria input 410.

In the example embodiment, cell highlighting interface 400 further includes an add highlight option 414, which enables a user to add another set of highlighting criteria similar to highlighting criteria 404. In one embodiment, cell highlighting interface 400 enables a user to join multiple highlighting criteria with Boolean conjunctions.

In the example embodiment, cell highlighting interface 400 includes a clear all option 416 and an apply option 418. Clear all option 416 clears all highlighting criteria, and apply option 418 applies the highlighting criteria to the data and causes CF computer device 102 to highlight data that meets the highlighting criteria.

Figure 5:
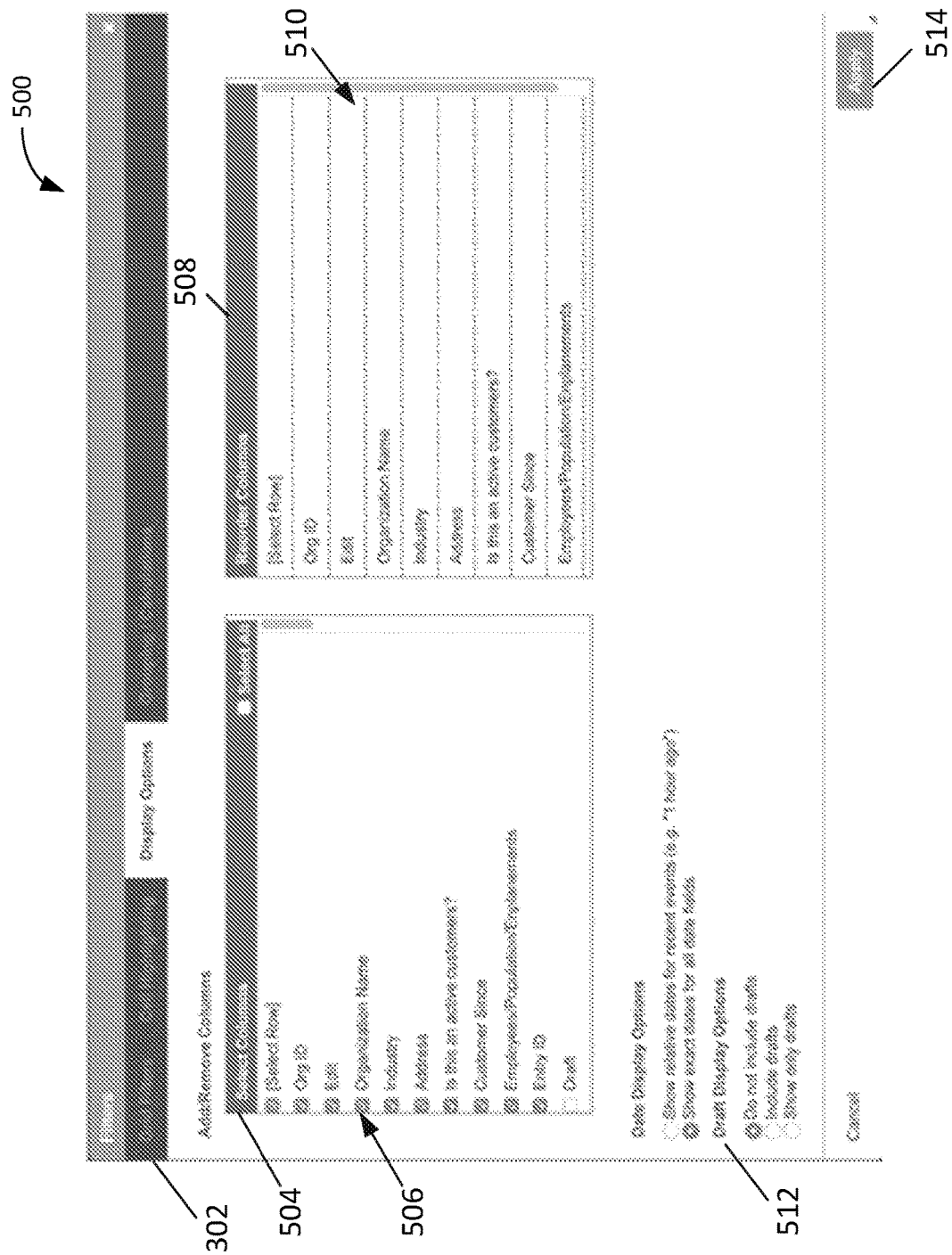

FIG. 5 illustrates a display options interface 500 generated by CF computer device 102 and displayed on user computer device 110 (both shown in FIG. 1). In the example embodiment, display options interface 500 enables a user to choose which columns to display and which columns to hide. Display options interface 500 includes functionality options 302, which are described in more detail with reference to FIG. 3A above.

In the example embodiment, display options interface 500 includes column selection interface 504, which enables a user to select from a plurality of column options 506. Selecting one of column options 506 enables a user to select whether to hide or display the column. In the example embodiment, the columns are associated with data fields of tabular data being processed (e.g., "name", "ID", "date modified", "location"). In the example embodiment, CF computer device 102 auto-populates column selection interface 504 with column options 506 based on the tabular data.

In the example embodiment, display options interface 500 further includes reorder columns interface 508, which enables a user to reorder a plurality of column options 510. Reorder columns interface 508 enables a user to select at least one of the plurality of column options 510 and drag and drop the column option into a different location, thereby altering the order in which the columns of the tabular data will be displayed.

In the example embodiment, display options interface 500 includes data display preferences 512, which enables a user to select or de-select certain display settings, such as "display relative dates" vs "display exact dates", "Include drafts" vs "Do not include drafts" vs "show only drafts", and any other preferences that may apply to the display of the tabular data. Display options interface 500 further includes apply option 514, which causes CF computer device 102 to apply column options 516 and reorder column options 510 to the tabular data.

Figure 6:
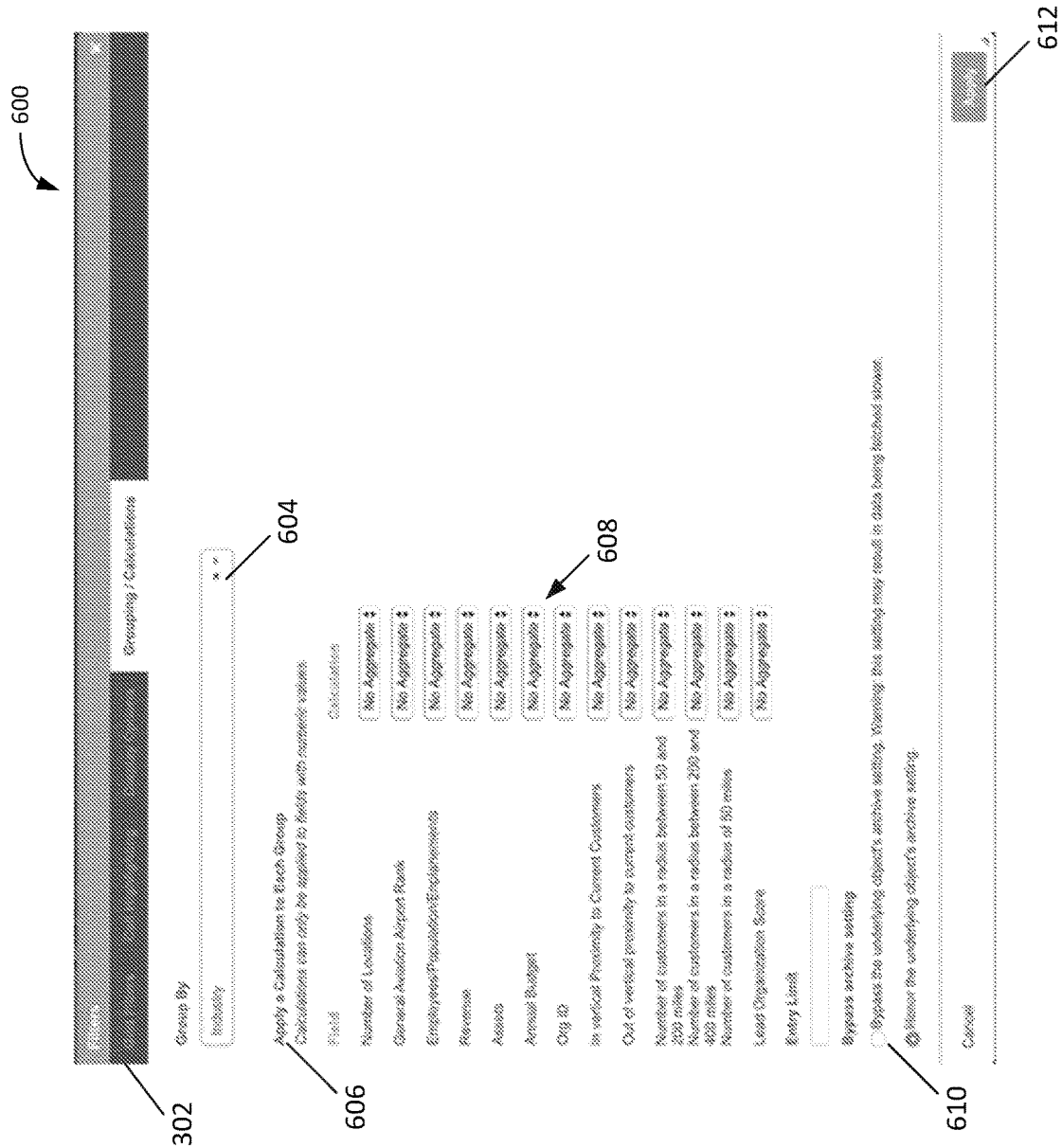

FIG. 6 illustrates a grouping and operations interface 600 generated by CF computer device 102 and displayed on user computer device 110 (both shown in FIG. 1). In the example embodiment, grouping and operations interface 600 enables a user to group data by specific data fields and perform various operations across the groupings. Grouping and operations interface 600 includes functionality options 302, which are described in more detail with reference to FIG. 3 above.

In the example embodiment, grouping and operations interface 600 includes grouping selection 604, which enables a user to select a data field by which to group tabular data being processed by CF computer device 102. For example, a user may choose to group the tabular data by "industry", such that subsequently applied operations are aggregated for each industry. Specifically, if all the entries of the tabular data are categorized within the industries "tech", "consulting", and "banking", applying operations to an industry grouping will result in three different values, one for each industry.

In the example embodiment, grouping and operations interface 600 includes operation selection interface 606, which includes a plurality of operation selections 608. Each operation selection 608 includes a data portion and a operation portion, where the data portion describes the data fields which will be included in the operation, and the operation portion describes the type of operation applied to the data. For example, for a given operation selection 608, the data portion may include "number of locations" or "sales in USD", and the operation portion may include "total", "count", "sum", or "percentage", among others. Operation selection 608 enables a user to select the operation portion for pre-populated data portions, thereby activating the operation to be included in the data.

In the example embodiment, grouping and operations interface 600 includes settings 610, which allow a user to select or activate a variety of settings and preferences associated with the grouping and operations processing. Grouping and operations interface 600 further includes apply option 612, which causes CF computer device 102 to apply the group and operations settings to the tabular data.

Figure 7:
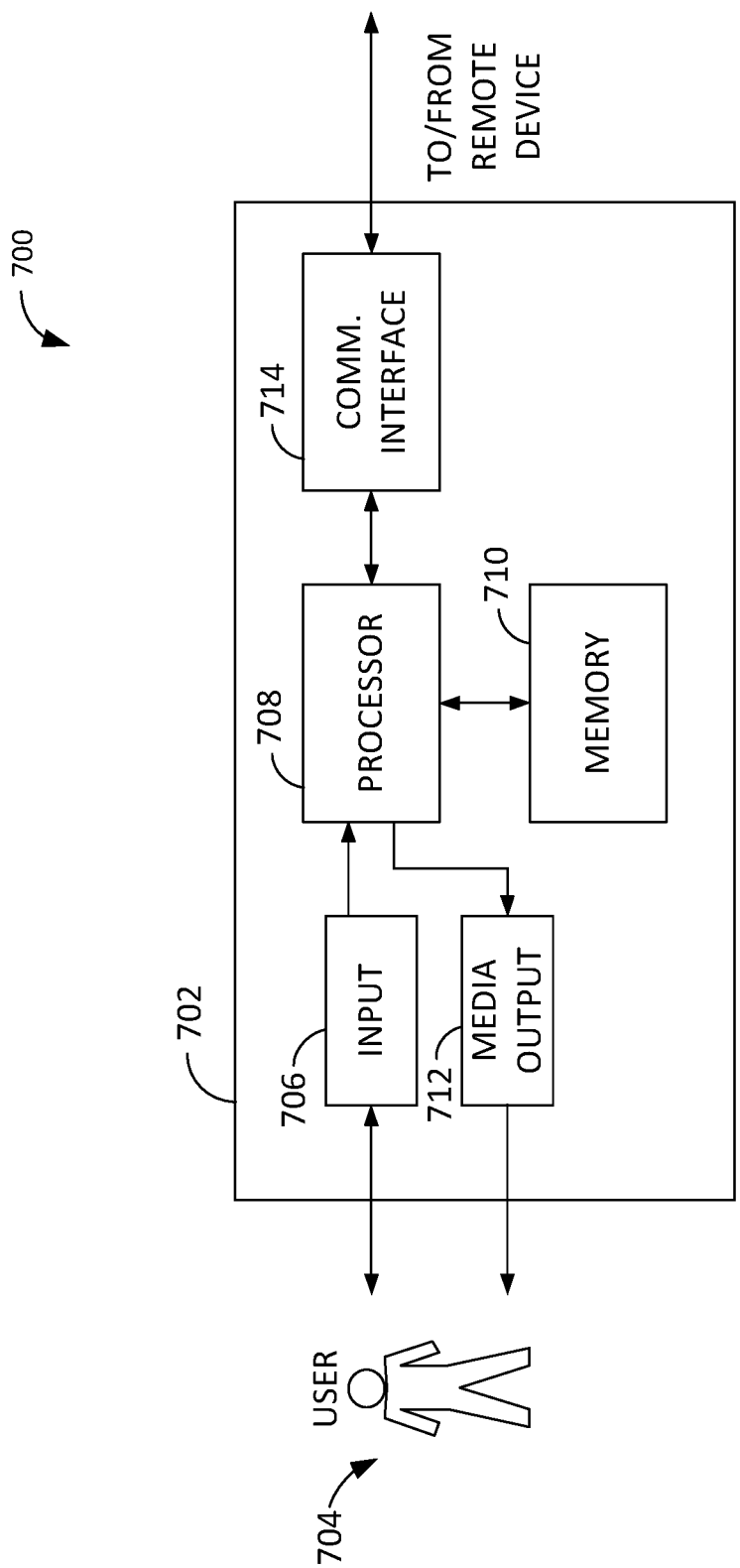

FIG. 7 illustrates an example configuration 700 of an example user computing device 702, such as user computing device 110 (shown in FIG. 1). In some embodiments, user computing device 702 is in communication with a custom filtering ("CF") computing device, such as CF computing device 102 (shown in FIG. 1). User computing device 702 may be representative of, but is not limited to user computing device 110. For example, user computing device 702 may be a smartphone, tablet, smartwatch, wearable electronic, laptop, desktop, vehicle computing device, or another type of computing device associated with the account holder.

User computing device 702 may be operated by a user 704 (e.g., a user of custom filtering ("CF") system 100, shown in FIG. 1). User computing device 702 may receive input from user 704 via an input device 706. User computing device 702 includes a processor 708 for executing instructions. In some embodiments, executable instructions may be stored in a memory area 710. Processor 708 may include one or more processing units (e.g., in a multi-core configuration). Memory area 710 may be any device allowing information such as executable instructions and/or transaction data to be stored and retrieved. Memory area 710 may include one or more computer-readable media.

User computing device 702 also may include at least one media output component 712 for presenting information to user 704. Media output component 712 may be any component capable of conveying information to user 704. In some embodiments, media output component 712 may include an output adapter (not shown), such as a video adapter and/or an audio adapter. An output adapter may be operatively coupled to processor 708 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones). In some embodiments, media output component 712 may be configured to present a graphical user interface (e.g., a web browser and/or a client application) to user 704.

In some embodiments, user computing device 702 may include input device 706 for receiving input from user 704. User 704 may use input device 706 to, without limitation, interact with CF computing system 100 (e.g., using an app), CF computing device 102, or any of user computer device 110 and database 112 (shown in FIG. 1). Input device 706 may include, for example, a keyboard, a pointing device, a mouse, a stylus, and/or a touch sensitive panel (e.g., a touch pad or a touch screen). A single component, such as a touch screen, may function as both an output device of media output component 712 and input device 706. User computing device 702 may further include at least one sensor, including, for example, an audio input device, a video input device, a gyroscope, an accelerometer, a position detector, a biometric input device, and/or a telematics data collection device. In some embodiments, at least some data collected by user computing device 702 may be transmitted to CF computing device 102.

User computing device 702 may also include a communication interface 714, communicatively coupled to any of CF computing device 102, user computer device 110, and database 112. Communication interface 714 may include, for example, a wired or wireless network adapter and/or a wireless data transceiver for use with a mobile telecommunications network.

Stored in memory area 710 may be, for example, computer-readable instructions for providing a user interface to user 704 via media output component 712 and, optionally, receiving and processing input from input device 706. The user interface may include, among other possibilities, a web browser and/or a client application. Web browsers enable users, such as user 704, to display and interact with media and other information typically embedded on a web page or a website hosted by CF computing device 102 and/or user computing device 702. A client application may allow user 704 to interact with, for example, any of CF computing device 102, user computer device 110, and database 112. For example, instructions may be stored by a cloud service and the output of the execution of the instructions sent to the media output component 712.

Figure 8:
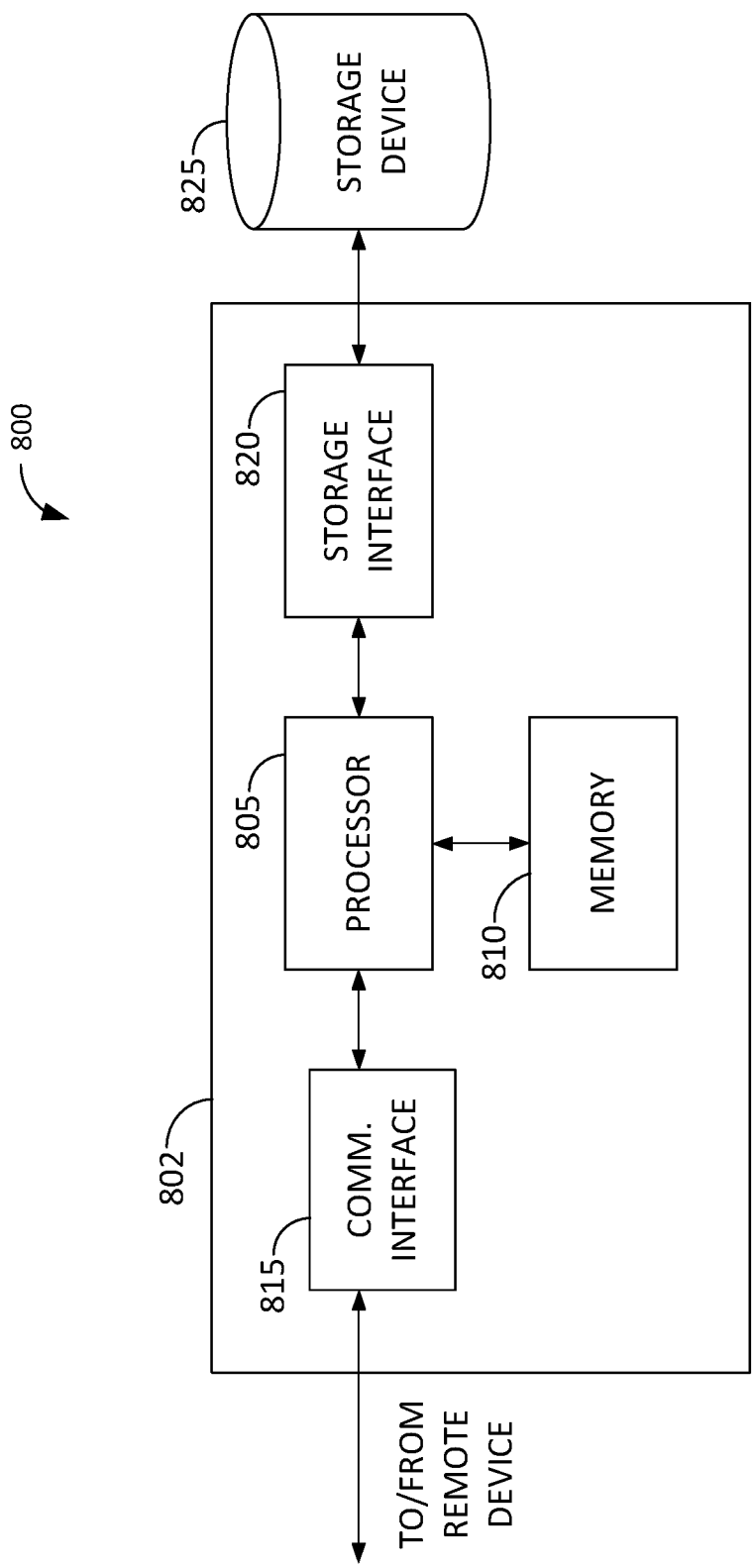

FIG. 8 depicts an example configuration 800 of an example server computing device 802, in accordance with one embodiment of the present disclosure. Server computer device 802 may include, but is not limited to, CF computing device 102 (shown in FIG. 1). Server computer device 802 may include a processor 805 for executing instructions. Instructions may be stored in a memory area 810. Processor 805 may include one or more processing units (e.g., in a multi-core configuration).

Processor 805 may be operatively coupled to a communication interface 815 such that server computer device 802 may be capable of communicating with a remote device such as another server computer device 802 or a user computing device, such as user computing device 702 (shown in FIG. 7). For example, communication interface 815 may receive requests from or transmit requests to user computing device 702 via the Internet.

Processor 805 may also be operatively coupled to a storage device 825. Storage device 825 may be any computer-operated hardware suitable for storing and/or retrieving data, such as, but not limited to, data associated with database 112 (shown in FIG. 1). In some embodiments, storage device 825 may be integrated in server computer device 802. For example, server computer device 802 may include one or more hard disk drives as storage device 825. In other embodiments, storage device 825 may be external to server computer device 802 and may be accessed by a plurality of server computer devices 802. For example, storage device 825 may include a storage area network (SAN), a network attached storage (NAS) system, and/or multiple storage units such as hard disks and/or solid state disks in a redundant array of inexpensive disks (RAID) configuration.

In some embodiments, processor 805 may be operatively coupled to storage device 825 via a storage interface 820. Storage interface 820 may be any component capable of providing processor 805 with access to storage device 825. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 825.

Processor 805 executes computer-executable instructions for implementing aspects of the disclosure. In some embodiments, processor 805 may be transformed into a special purpose microprocessor by executing computer-executable instructions or by otherwise being programmed.

Figure 9:
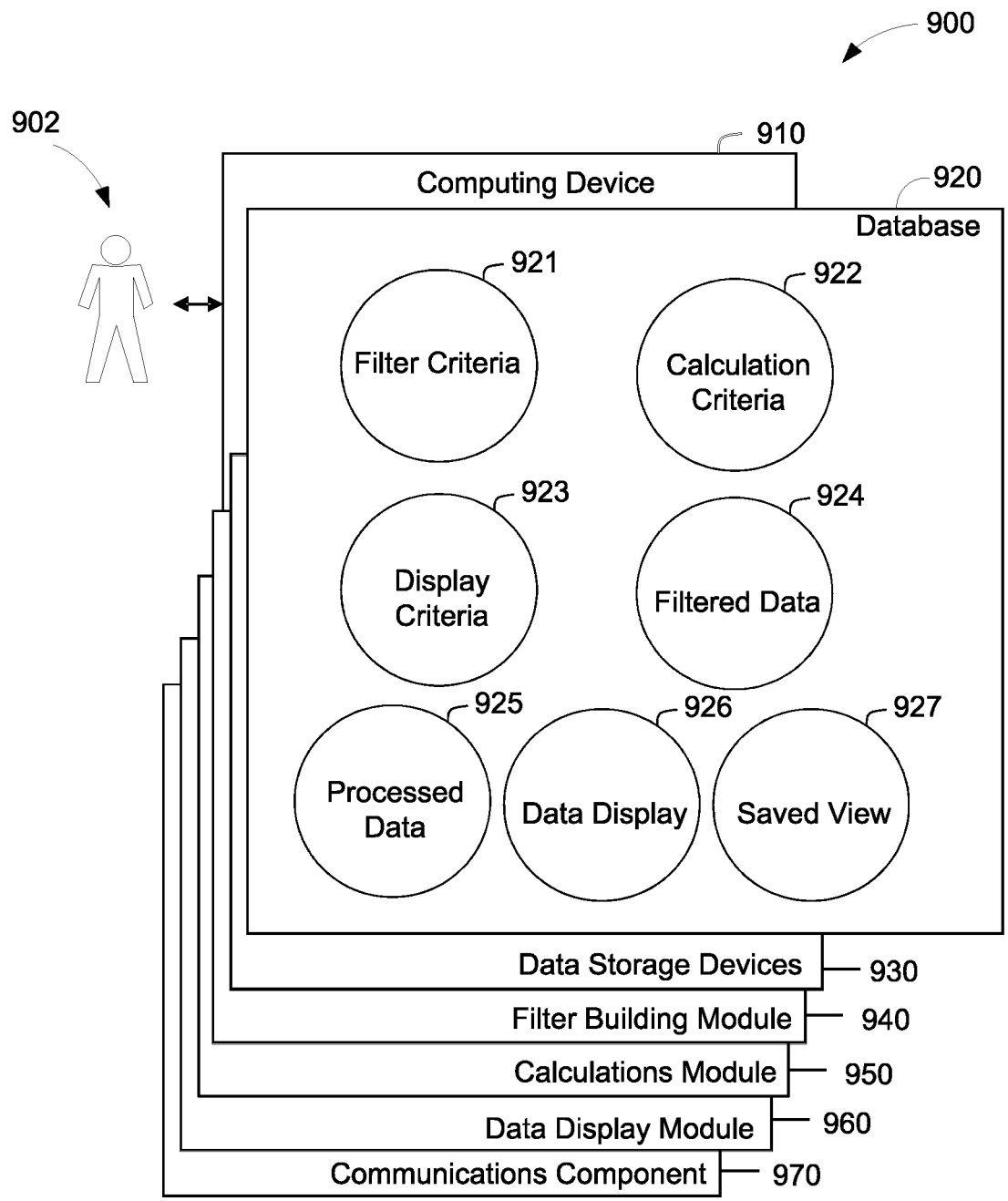

FIG. 9 depicts a diagram 900 of components of one or more example computing devices 910 that may be used in a custom filtering system, such as custom filtering ("CF") computer system 100 (shown in FIG. 1). In some embodiments, computing device 910 may be similar to CF computing device 102 (shown in FIG. 1). Database 920 may be coupled with several separate components within computing device 910, which perform specific tasks. In the present embodiment, database 920 may store at least filter criteria 921, operations criteria 922, display criteria 923, filtered data 924, processed data 925, data display 926, and saved view 927. In some embodiments, database 920 is similar to database 112 (shown in FIG. 1).

Computing device 910 may include database 920, as well as data storage devices 930, which may be used, for example, for storing data, such any of the data mentioned herein, locally. Computing device 910 may also include filter building module 940, operations module 950, data display module 960, and communications component 970, which may be utilized to implement the functionalities of a CF computer device as described herein.

Figure 10:
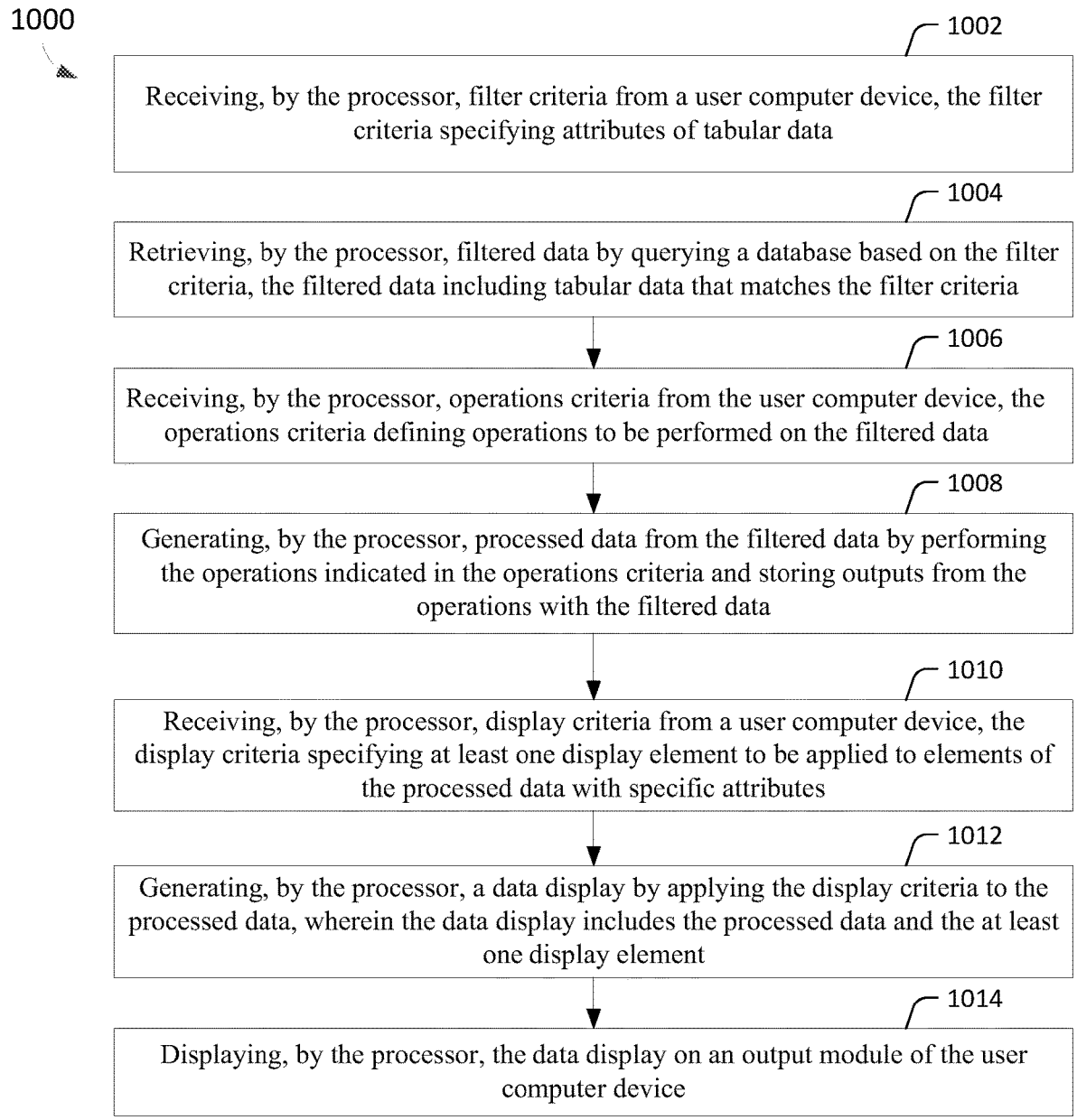

FIG. 10 depicts a flow chart illustrating an example computer-implemented method 1000 for enabling custom filtering and management of tabular data is provided. Method 1000 may be implemented by a computer system including at least one processor, such as CF computer system 100 and CF computing device 102 (shown in FIG. 1).

Method 1000 includes receiving 1002 filter criteria from a user computer device, the filter criteria specifying tabular data with specific attributes; retrieving 1004 filtered data by querying a database based on the filter criteria, the filtered data including tabular data that matches the filter criteria; receiving 1006 operations criteria from the user computer device, the operations criteria defining operations to be performed on the filtered data; generating 1008 processed data from the filtered data by performing the operations indicated in the operations criteria and storing outputs from the operations with the filtered data; receiving 1010 display criteria from a user computer device, the display criteria specifying at least one display element to be applied to elements of the processed data with specific attributes; generating 1012 a data display by applying the display criteria to the processed data, wherein the data display includes the processed data and the at least one display element; and displaying 1014 the data display on an output module of the user computer device.

In some embodiments, the CF computer device 102 stores one or more conditions, such as those set by one or more users. The CF computer device 102 compares the processed data to one or more conditions. The CF computer device 102 generates at least one notification when the processed data meets at least one of the one or more conditions. The CF computer device 102 may generate and transmit one or more emails to one or more individuals based upon the processed data meeting the at least one of the one or more conditions. The CF computer device 102 may instruct an additional program to adjust one or more parameters based upon the processed data meeting the at least one of the one or more conditions.

In some embodiments, the CF computer device 102 links to one or more tables containing processed data. The CF computer device 102 receives an update to the filtered data. The CF computer device 102 updates the processed data based upon the update to the filtered data. The CF computer device 102 exports the processed data to a first program. Subsequent to receiving an update to the filtered data, the CF computer device 102 updates the processed data in the first programed based upon the update to the filtered data. The CF computer device 102 exports the processed data to a first table. Subsequent to receiving an update to the filtered data, the CF computer device 102 updates the processed data in the first table based upon the update to the filtered data.

Figure 11A:
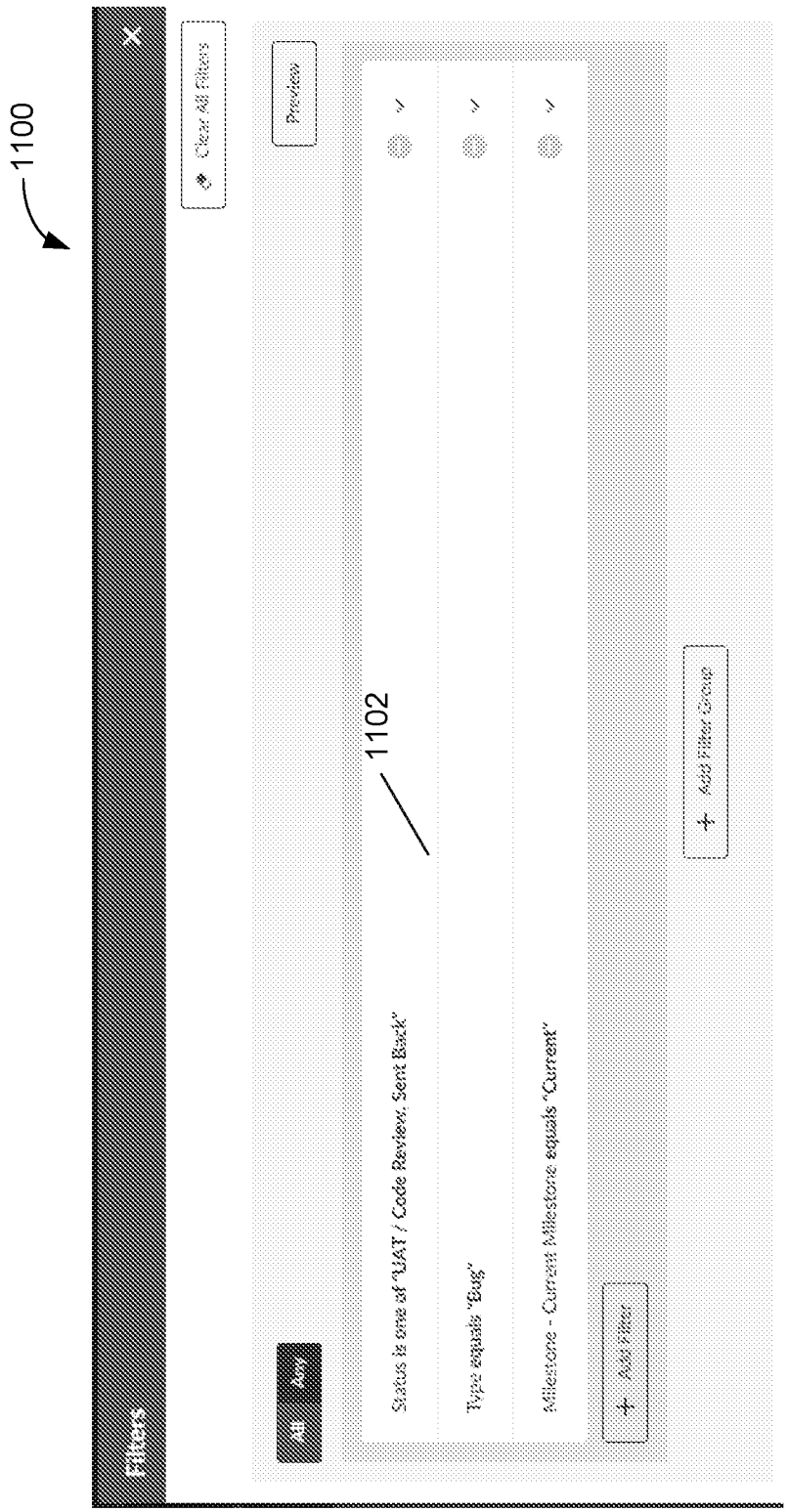
Figure 11B:
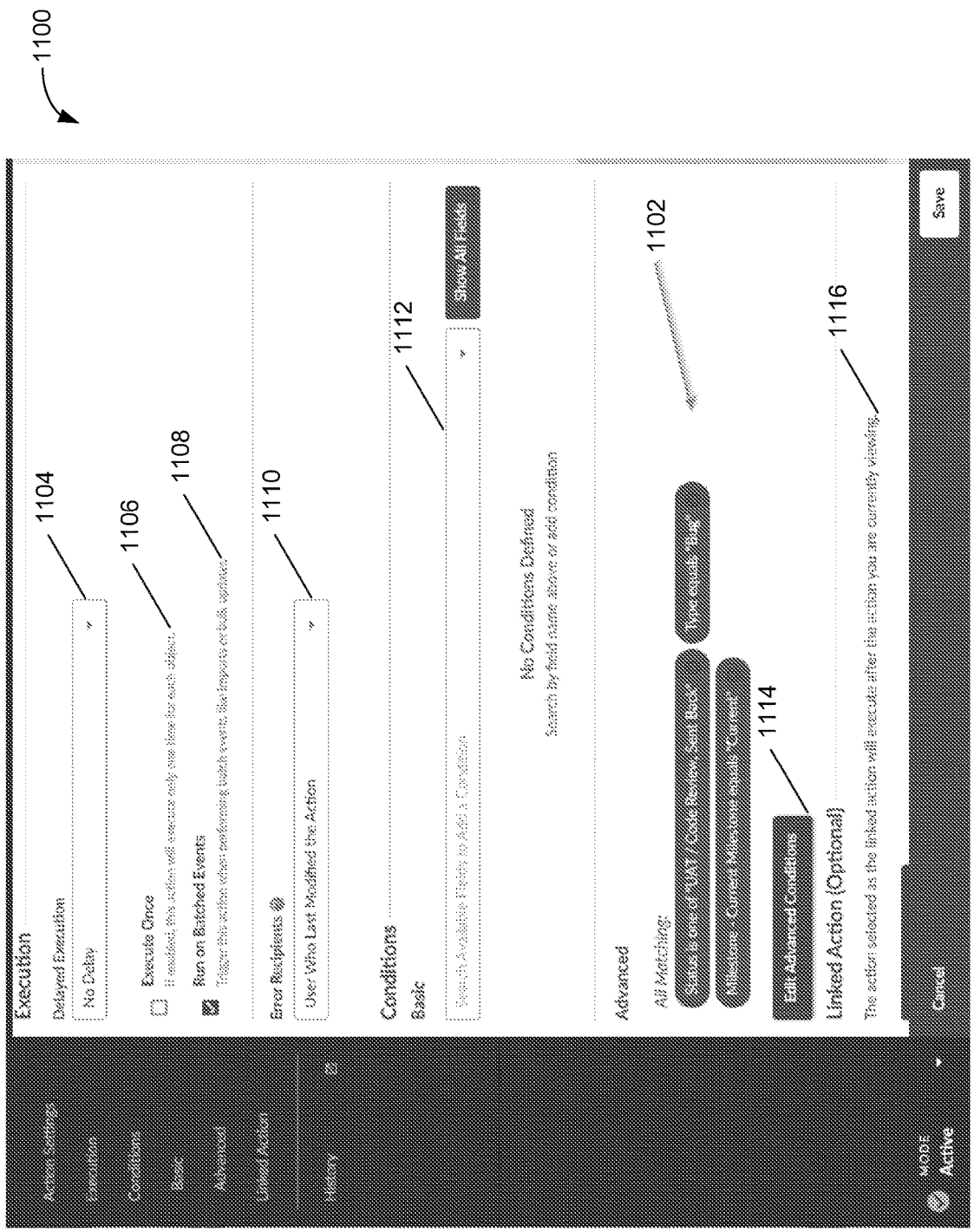

FIGS. 11A and 11B illustrate a filter condition building interface 1100 generated by CF computer device 102 and displayed on user computer device 110 (both shown in FIG. 1). Filter condition building interface 1100 allows a user to enter inputs for building conditions used by CF computer device 102 to determine if the filtered data has met one or more conditions. When one or more of the conditions are met then one or more pre-determined actions are triggered. In some situations, an action may trigger upon a single condition being met. In other situations, an action may trigger only when multiple conditions are met. Furthermore, multiple actions may be triggered on the same conditions.

FIG. 11A illustrates a plurality of filter conditions 1102. These shown conditions 1102 include status, type and milestone, but the conditions 1102 could be any label or value used in the filtered data.

FIG. 11B illustrates a further view of the filter condition building interface 1100. Filter condition building interface 1100 includes multiple options. The filter condition building interface 1100 includes a delay execution option 1104 that allows the user to delay the execution of the action after the trigger conditions have been met. The filter condition building interface 1100 also includes an execute once option 1106 that allows the user to have the action be executed only once when the condition(s) are met rather than every time that the condition(s) are met. The filter condition building interface 1100 further includes a run on batched events options 1108 that causes the action to be triggered when performing batched events like import and/or bulk updates. The filter condition building interface 1100 additionally includes an error recipient(s) field 1110 that determines who is notified for any errors that occur when the action is executing or the condition(s) are being compared. The add basic condition field 1112 allows the user to add basic conditions, such as predetermined actions that may be selected from a pull down. The add advanced condition field 1114 allows the user to generate advanced conditions. The link action field allows the user to add additional actions that would be triggered when the condition(s) are met.

In the example embodiment, the CF computer device 102 is configured to store one or more conditions. When a condition is matched, then the CF computer device 102 can perform one or more additional actions. When one or more of the conditions are met then one or more pre-determined actions are triggered. In some situations, an action may trigger upon a single condition being met. In other situations, an action may trigger only when multiple conditions are met. Furthermore, multiple actions may be triggered on the same conditions. For example, if a condition for number of accounts opened has been reached, the CF computer device 102 may generate and transmit one or more notifications, such as, but not limited to, emails. The notifications may be sent to specific individuals or to all of the accounts depending on how the user set-up the conditions and response. In another situation, the CF computer device 102 may generate a work order, a purchase order, and/or other types of documents when at least one of the one or more conditions are reached.

In the example embodiment, the CF computer device 102 creates dynamic a list of people from the filter results. The CF computer device 102 generates a list (table) of people or objects with attributes that may include, but are not limited to, function, location, weight, length, PH, etc. For example, the CF computer device 102 can build a filter to show all Finance people in Illinois, and use that rule to populate the "Illinois, Finance List," This list is dynamically rebuilt. The dynamic list is then referenced in static plans, but the dynamic nature ensures that the people in the list are always current. The records in the database or table may change but the filter-list connection keeps the list up to date. For the list of finance people, and the CF computer device 102 adds an additional record with the attribute Illinois, the CF computer device 102 adds that record to the list automatically for use anywhere else. The list may be used in another table, for sending a regular email (aka a mailing list), or for sending Christmas presents. The list may be used by a program or system separate from the CF computer device 102 and updated through a connection to the other program or system that is using the dynamic list.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of fraud analysis for registration of merchants with acquirer banks. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the CF computer device are described herein as including general processing and memory devices, it should be understood that the CF computer device is a specialized computer configured to perform the steps described herein for filtering and managing tabular data.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A custom filtering computer system for enabling custom filtering and management of tabular data, the custom filtering computer system comprising at least one processor in communication with at least one memory device, wherein the at least one processor is programmed to:
    retrieve filtered data by querying one or more databases based on filter criteria;
    receive operations criteria defining operations to be performed on the filtered data;
    generate processed data comprising the filtered data and operation outputs, by performing the operations defined in the operations criteria and storing the operation outputs with the filtered data;
    compare the processed data to one or more conditions; and
    generate at least one notification when the processed data meets at least one of the one or more conditions.

2. The custom filtering computer system of claim 1, wherein the at least one processor is further programmed to generate and transmit one or more emails to one or more individuals based upon the processed data meeting the at least one of the one or more conditions.

3. The custom filtering computer system of claim 1, wherein the at least one processor is further programmed to instruct an additional program to adjust one or more parameters based upon the processed data meeting the at least one of the one or more conditions.

4. The custom filtering computer system of claim 1, wherein the at least one processor is further programmed to:
    receive display criteria specifying at least one display element to be applied to elements of the processed data with specific attributes; and
    generate a data display by applying the display criteria to the processed data, wherein the data display includes the processed data and the at least one display element.

5. The customer filtering computer system of claim 4, wherein the at least one processor is further programmed to:
    store a saved view of the data display including one or more of the filter criteria, the operations criteria, or the display criteria; and
    at a subsequent time, re-execute the saved view for one or more updated databases.

6. The custom filtering computer system of claim 1, wherein the at least one processor is further programmed to receive, from a user, the filter criteria specifying attributes of tabular data.

7. The customer filtering computer system of claim 1 further comprising an output module, wherein the at least one processor is further programmed to display the data display on the output module.

8. The custom filtering computer system of claim 1, wherein the at least one processor is further programmed to:
    provide a user with a plurality of options to generate filter criteria;
    receive one or more filter groups based on the plurality of options; and
    generate the filter criteria based on the received one or more filter groups.

9. The custom filtering computer system of claim 1, wherein the at least one processor is further programmed to:
    determine that at least one of the one or more databases includes private information; and
    request access credentials from a user to access the private information.

10. A computer-implemented method for enabling custom filtering and management of tabular data, the method implemented by a computer system including at least one processor, the method comprising:
    retrieving, by the processor, filtered data by querying one or more databases based on filter criteria;
    receiving, by the processor, operations criteria defining operations to be performed on the filtered data;
    generating, by the processor, processed data comprising the filtered data and operation outputs, by performing the operations defined in the operations criteria and storing the operation outputs with the filtered data;
    receiving an update to the filtered data; and
    updating the processed data based upon the update to the filtered data.

11. The method of claim 10 further comprising:
    exporting the processed data to a first program; and subsequent to receiving an update to the filtered data, updating the processed data in the first program based upon the update to the filtered data.

12. The method of claim 10 further comprising:
exporting the processed data to a first table; and
subsequent to receiving an update to the filtered data, updating the processed data in the first table based upon the update to the filtered data.

13. The method of claim 10 further comprising:
receiving, by the processor, display criteria specifying at least one display element to be applied to elements of the processed data with specific attributes; and
generating, by the processor, a data display by applying the display criteria to the processed data, wherein the data display includes the processed data and the at least one display element.

14. The method of claim 13 further comprising:
storing a saved view of the data display including one or more of the filter criteria, the operations criteria, or the display criteria; and
at a subsequent time, re-executing the saved view for one or more updated databases.

15. The method of claim 10 further comprising receiving, by the processor, from a user, the filter criteria specifying attributes of tabular data.

16. The method of claim 10 further comprising displaying the data display on an output module of the computer system.

17. The method of claim 10 further comprising:
providing a user with a plurality of options to generate filter criteria;
receiving one or more filter groups based on the plurality of options; and
generating the filter criteria based on the received one or more filter groups.

18. The method of claim 10 further comprising:
determining that at least one of the one or more databases includes private information;
requesting access credentials from a user to access the private information;
determining an access level of the user based on the access credentials; and
further filtering the filtered data to remove data that the user is not approved to access.

19. The method of claim 10, wherein the operations criteria includes one or more of querying another database, serially querying a plurality of databases, and accessing a real-time system, and wherein the real-time system is an Internet of Things sensor.

20. At least one non-transitory computer-readable storage media having computer-executable instructions embodied thereon for enabling custom filtering and management of tabular data, wherein when executed by at least one processor, the computer-executable instructions cause the processor to:
retrieve filtered data by querying one or more databases based on filter criteria;
receive operations criteria defining operations to be performed on the filtered data;
generate processed data comprising the filtered data and operation outputs, by performing the operations defined in the operations criteria and storing the operation outputs with the filtered data;
compare the processed data to one or more conditions; and
generate at least one notification when the processed data meets at least one of the one or more conditions.

* * * * *